United States Patent
Bai et al.

(10) Patent No.: US 11,268,009 B2
(45) Date of Patent: Mar. 8, 2022

(54) FIBER ASSISTED RE-CROSSLINKABLE POLYMER GEL AND PREFORMED PARTICLE GELS FOR FLUID LOSS AND CONFORMANCE CONTROL

(71) Applicant: The Curators of the University of Missouri, Columbia, MO (US)

(72) Inventors: Baojun Bai, Rolla, MO (US); Ze Wang, Rolla, MO (US); Zhe Sun, Beijing (CN); Jingyang Pu, Austin, TX (US); Thomas Schuman, Rolla, MO (US)

(73) Assignee: THE CURATORS OF THE UNIVERSITY OF MISSOURI, Columbia, MO (US)

( * ) Notice: Subject to any disclaimer, the term of this patent is extended or adjusted under 35 U.S.C. 154(b) by 0 days.

(21) Appl. No.: 17/014,608

(22) Filed: Sep. 8, 2020

(65) Prior Publication Data

US 2020/0407622 A1 Dec. 31, 2020

Related U.S. Application Data

(63) Continuation-in-part of application No. 16/306,148, filed as application No. PCT/US2017/035542 on Jun.
(Continued)

(51) Int. Cl.
*C09K 8/42* (2006.01)
*C08J 5/04* (2006.01)
(Continued)

(52) U.S. Cl.
CPC ............ *C09K 8/426* (2013.01); *C08J 3/075* (2013.01); *C08J 5/045* (2013.01); *C08J 5/046* (2013.01);
(Continued)

(58) Field of Classification Search
None
See application file for complete search history.

(56) References Cited

U.S. PATENT DOCUMENTS

| 4,569,393 A | 2/1986 | Bruning et al. |
| 4,657,944 A | 4/1987 | Bruning et al. |

(Continued)

FOREIGN PATENT DOCUMENTS

| CN | 105504158 A | 4/2016 |
| WO | 98/06929 A2 | 2/1998 |

(Continued)

OTHER PUBLICATIONS

Coste et al., "In-Depth Fluid Diversion by Pre-Gelled Particles. Laboratory Study and Pilot Testing," 2000 SPE/DOE Improved Oil Recovery Symposium held in Tulsa, Oklahoma, Apr. 3-5, 2000, 8 pages.
(Continued)

*Primary Examiner* — John J Figueroa
(74) *Attorney, Agent, or Firm* — Hovey Williams LLP

(57) ABSTRACT

Described herein are compositions useful for controlling fluid flow, for example in a target zone of a subterranean environment, and methods of forming and using the same. The composition generally comprises a quantity of fibers and a quantity of swellable particles, which may be dispersed in a carrier fluid. The composition may be synthesized in the form of a bulk gel or may be gelatinated during use. The fibers in the compositions provide improved performance as compared to prior PPG and RPPG particle-containing compositions. Specifically, the compositions reinforce the re-cross-linked/re-associated hydrogel plug in underground features and support proper rehydration of RPPG particles with water or brine to better to provide
(Continued)

structural support for the particles within the gel and to more completely fill underground void space conduits.

29 Claims, 11 Drawing Sheets

Related U.S. Application Data 1, 2017, now Pat. No. 11,162,016, application No. 17/014,608, filed on Sep. 8, 2020, which is a continuation-in-part of application No. 16/552,540, filed on Aug. 27, 2019, and a continuation-in-part of application No. PCT/US2020/013094, filed on Jan. 10, 2020.

(60) Provisional application No. 62/344,732, filed on Jun. 2, 2016, provisional application No. 62/725,610, filed on Aug. 31, 2018.

(51) Int. Cl.
| | |
|---|---|
| C08J 3/075 | (2006.01) |
| E21B 43/16 | (2006.01) |
| C08K 5/00 | (2006.01) |
| C08K 3/04 | (2006.01) |
| C08K 3/22 | (2006.01) |
| C08K 3/36 | (2006.01) |

(52) U.S. Cl.
CPC ............ *E21B 43/16* (2013.01); *C08J 2433/26* (2013.01); *C08K 3/041* (2017.05); *C08K 3/042* (2017.05); *C08K 3/36* (2013.01); *C08K 5/005* (2013.01); *C08K 5/0016* (2013.01); *C08K 5/0025* (2013.01); *C08K 2003/2227* (2013.01)

(56) References Cited

U.S. PATENT DOCUMENTS

| | | | |
|---|---|---|---|
| 4,793,416 | A | 12/1988 | Mitchell |
| 4,903,767 | A | 2/1990 | Shu et al. |
| 4,921,635 | A | 5/1990 | Enick |
| 4,941,533 | A | 7/1990 | Buller et al. |
| 5,399,269 | A | 3/1995 | Moradi-Araghi |
| 5,423,380 | A | 6/1995 | Johnston et al. |
| 5,465,792 | A | 11/1995 | Dawson et al. |
| 5,480,933 | A | 1/1996 | Fox et al. |
| 5,735,349 | A | 4/1998 | Dawson et al. |
| 6,165,947 | A | 12/2000 | Chang et al. |
| 6,454,003 | B1 | 9/2002 | Chang et al. |
| 7,300,973 | B2 | 11/2007 | Chang et al. |
| 7,644,764 | B2 | 1/2010 | Berkland et al. |
| 8,183,184 | B2 | 5/2012 | Berkland et al. |
| 8,389,446 | B2 | 3/2013 | Moradi-Araghi et al. |
| 8,822,388 | B2 | 9/2014 | Bums et al. |
| 9,139,762 | B2 | 9/2015 | Moradi-Araghi et al. |
| 9,267,075 | B2 | 2/2016 | Moradi-Araghi et al. |
| 9,701,887 | B2 | 7/2017 | Bums et al. |
| 9,777,122 | B2 | 10/2017 | O'Brien et al. |
| 10,000,683 | B2 | 6/2018 | Galindo et al. |
| 10,323,174 | B2 | 6/2019 | Guan et al. |
| 10,407,612 | B2 | 9/2019 | Guan et al. |
| 10,457,857 | B2 | 10/2019 | Perry et al. |
| 2004/0182575 | A1 | 9/2004 | Reddy |
| 2007/0204989 | A1 | 9/2007 | Tang |
| 2010/0234252 | A1 | 9/2010 | Moradi-Araghi |
| 2010/0314114 | A1 | 12/2010 | Moradi-Araghi et al. |
| 2011/0036583 | A1 | 2/2011 | Willberg et al. |
| 2011/0094746 | A1* | 4/2011 | Allison ................ C09K 8/424 166/308.5 |
| 2012/0037364 | A1 | 2/2012 | Guan et al. |
| 2012/0285691 | A1 | 11/2012 | Berger et al. |
| 2014/0060843 | A1* | 3/2014 | Murphy ................ C09K 8/512 166/310 |
| 2014/0090850 | A1 | 4/2014 | Benicewicz et al. |
| 2014/0102707 | A1 | 4/2014 | Moradi-Araghi et al. |
| 2014/0131043 | A1 | 5/2014 | Moradi-Araghi et al. |
| 2014/0144628 | A1 | 5/2014 | Moradi-Araghi et al. |
| 2014/0228258 | A1* | 8/2014 | Mahoney ................ C09K 8/80 507/219 |
| 2016/0137906 | A1 | 5/2016 | Guan et al. |
| 2017/0166797 | A1* | 6/2017 | Reddy ................... E21B 33/138 |
| 2018/0002592 | A1 | 1/2018 | Guan et al. |
| 2019/0119559 | A1 | 4/2019 | Kemira |

FOREIGN PATENT DOCUMENTS

| | | |
|---|---|---|
| WO | 2010/144588 A1 | 12/2010 |
| WO | 2013/006275 A2 | 1/2013 |
| WO | 2013/112664 A1 | 8/2013 |
| WO | 17/210486 A1 | 12/2017 |

OTHER PUBLICATIONS

Sydansk et al., "Gel conformance treatments increase oil production in Wyoming," Oil and Gas Journal, Jan. 20, 1992, vol. 90:3, 3 pages.(abstract only attached).

Chauveteau et al., "Controlling Gelation Time and Microgel Size for Water Shutoff," SPE 59317, Society of Petroleum Engineers Inc., Prepared for Presentation at the 2000 SPE/DOE Improved Oil Recovery Symposium held in Tulsa, Oklahoma, Apr. 3-5, 2000, 8 pages.

Rousseau et al., "Rheology and Transport in Porous Media of New Water Shutoff/Conformance Control Microgels," SPE 93254, Society of Petroleum Engineers Inc., Prepared for Presentation at the 2005 SPE International Symposium on Oilfield Chemistry held in Houston, Texas, Feb. 2-4, 2005, 12 pages.

Zaitoun et al., "Using Microgels To Shut Off Water in a Gas Storage Well," SPE 106042, Society of Petroleum Engineers, Prepared for Presentation at the 2007 SPE International Symposium on Oilfield Chemistry held in Houston, Texas, Feb. 28-Mar. 2, 2007, 8 pages.

Al-Anazi et al., "Use of a pH Sensitive Polymer for Conformance Control," SPE 73782, Society of Petroleum Engineers Inc., Prepared for Presentation at the SPE International Symposium and Exhibition on Formation Damage Control held in Lafayette, Louisiana, Feb. 20-21, 2002, 8 pages.

Benson et al., "Development and Use of a Simulation Model for Mobility/Conformance Control Using a pH-Sensitive Polymer," SPE 109665, Society of Petroleum Engineers, Prepared for Presentation at the 2007 SPE Annual Technical Conference and Exhibition held in Anaheim, California, Nov. 11-14, 2007, 10 pages.

Pritchett et al., "Field Application of a New In-Depth Waterflood Conformance Improvement Tool," SPE 84897, Society of Petroleum Engineers Inc., Prepared for Presentation at the SPE International Improved Oil Recovery Conference in Asia Pacific held in Lumpur, Malaysia, Oct. 20-21, 2003, 8 pages.

Frampton et al., "Development of a novel waterflood conformance control system," SPE 89391, Society of Petroleum Engineers Inc., Prepared for Presentation at the 2004 SPE/DOE Fourteenth Symposium on Improved Oil Recovery held in Tulsa, Oklahoma, Apr. 17-21, 2004, 9 pages.

Bai et al., "Field and Lab Experience with a Successful Preformed Particle Gel Conformance Control Technology," SPE 164511, Society of Petroleum Engineers, Prepared for Presentation at the SPE Production and Operations Symposium held in Oklahoma City, Oklahoma, Mar. 23-26, 2013, 17 pages.

Zhang et al., "Preformed-Particle-Gel Transport Through Open Fractures and Its Effect on Water Flow," SPE 129908, Society of Petroleum Engineers, SPE Journal, Jun. 2011, pp. 388-400.

Imqam et al., "Preformed Particle Gel Extrusion through Open Conduits during Conformance Control Treatments," SPE-169107-MS, Society of Petroleum Engineers, Prepared for Presentation at the SPE Improved Oil Recovery Symposium held in Tulsa, Oklahoma, Apr. 12-16, 2014, 15 pages.

Almohsin et al., SPE-169078-MS, "Transport of Nanogel through Porous Media and Its Resistance to Water Flow," Society of

(56) References Cited

OTHER PUBLICATIONS

Petroleum Engineers, Prepared for Presentation at the SPE Improved Oil Recovery Symposium held in Tulsa, Oklahoma, Apr. 12-16, 2014, 14 pages.
International Search Report and Written Opinion dated Dec. 16, 2019 in corresponding PCT/US2019/048349 filed Aug. 27, 2019, 10 pages.
Wang et al., "Mechanically robust re-crosslinkable polymeric hydrogels for water management of void space conduits containing reservoirs," Chemical Engineering Journal, 2017, vol. 317, pp. 952-960.
Lee et al. (2007). "CO2-in-Water Emulsion-Templated Poly(vinyl alcohol) Hydrogels Using Poly(vinyl acetate)-Based Surfactants," Macromolecules, 40(6), 1955-1961.
Yamamoto et al. (2003). "Synthesis and Thermosensitive Properties of Poly[(N-vinylamide)-co-(vinyl acetate)]s and Their Hydrogels," Macromolecular Chemistry and Physics, 204(7), 1027-1033.
Ranjha et al. "Swelling and Aspirin Release Study: Cross-Linked pH-Sensitive Vinyl Acetate-co-Acrylic Acid (VAC-co-AA) Hydrogels," Drug Development and Industrial Pharmacy 34.5 (2008): 512-521.
International Search Report and Written Opinion received in connection with PCT/US20/13094 dated Mar. 24, 2020, 25 pages.
Wang, L. et al. "Mechanically robust re-crosslinkable polymeric hydrogels for water management of void space conduits containgin reservoirs", Chemical Engineering Journal 317 (2017) 952-960.
International Search Report and Written Opinion dated Aug. 11, 2017 in corresponding PCT/US2017/035542 filed Jun. 1, 2017, 12 pages.
International Preliminary Report on Patentability dated Dec. 13, 2018 in corresponding PCT/US2017/035542 filed Jun. 1, 2017, 8 pages.
Office Action dated Oct. 7, 2019 in corresponding Chilean Patent Application No. 3397-2018, 14 pages.
Office Action dated Oct. 2, 2020 in corresponding Russian Patent Application No. 2018141482, 4 pages.
Search Report dated Sep. 30, 2020 in corresponding Russian Patent Application No. 2018141482, 2 pages.
Office Action Summary (and English translation) dated Sep. 28, 2020 in corresponding Chinese Patent Application No. 201780033570. 2, 4 pages.
Machine Translation of CN105504158, 14 pages.
Machine Translation of Office Action in corresponding Russian Patent Application No. 2018141482, 6 pages.
Machine Translation of Search Report in corresponding Russian Patent Application No. 2018141482, 4 pages.
Text of the Office Action dated Sep. 28, 2020 in corresponding Chinese Patent Application No. 201780033570.2, 7 pages (no English version available).
Text of the Office Action dated Mar. 17, 2021 in corresponding Colombian Patent Application No. 3621, 1 page (no English version available).

* cited by examiner

Add 0.4% fiber

FIBER ASSISTED RE-CROSSLINKABLE POLYMER GEL AND PREFORMED PARTICLE GELS FOR FLUID LOSS AND CONFORMANCE CONTROL

CROSS-REFERENCE TO RELATED APPLICATIONS

This application is a continuation-in-part application of U.S. application Ser. No. 16/306,148, filed Nov. 30, 2018, entitled RE-ASSEMBLING POLYMER PARTICLE PACKAGE FOR CONFORMANCE CONTROL AND FLUID LOSS CONTROL, which claims priority to PCT International Patent Application No. PCT/US2017/035542, filed Jun. 1, 2017, which claims the priority benefit of U.S. Provisional Patent Application No. 62/344,732, filed Jun. 2, 2016. This application is also a continuation-in-part of U.S. application Ser. No. 16/552,540, filed Aug. 27, 2019, entitled RE-CROSSLINKING PARTICLE GEL FOR $CO_2$ CONFORMANCE CONTROL AND $CO_2$ LEAKAGE BLOCKING, which claims the priority benefit of U.S. Provisional Patent Application No. 62/725,610, filed Aug. 31, 2018. This application is also a continuation-in-part of PCT International Patent Application No. PCT/US2020/013094, filed Jan. 10, 2020, entitled RE-CROSSLINKABLE PARTICLE FOR CONFORMANCE CONTROL AND TEMPORARY PLUGGING. Each of the listed earlier-filed applications are hereby incorporated by reference in their entireties into the current application.

BACKGROUND OF THE INVENTION

Field of the Invention

The present invention generally relates to the use of particle gels to control fluid channeling problems in a porous underground rock formations or reservoirs.

Description of the Prior Art

Voids, wormholes, fractures, fracture-like channels and other abnormal openings often exist naturally in porous underground rock formations or reservoirs or are formed by injecting fluid in reservoir flooding processes such as secondary and tertiary oil recovery processes that are used in the production of oil from hydrocarbon-containing reservoirs. The resulting heterogeneity in the permeability of fluids travelling through the reservoir can often cause the injection fluids to preferentially channel through the abnormal openings, resulting in an inefficient and uneconomic flooding process. In-situ gels and, more recently, preformed particle gels (PPGs) have been used to plug or significantly decrease the permeability of fractures or fracture-like channels and thereby result in a more efficient and economical flooding process. PPGs were designed to overcome some inherent drawbacks of the traditional in-situ gels, such as the change of gelant composition during injection, gelation uncertainty, and uncontrollability. Additionally, with a larger particle size and a higher gel strength (elastic modulus), the PPGs can be more precisely placed into the fractures with minimized damage to unswept hydrocarbon-rich formations.

A re-cross-linkable preformed particle gel (RPPG) has been recently developed to improve the performance of conventional PPGs by enabling the gel particles to re-assemble as an integral material after placement in the fractures. Studies showed that the re-cross-linked RPPGs have significant toughness and high elastic modulus that could more effectively resist fluid flow in the large opening fractures, manifesting as a higher breakthrough pressure and a higher resistance to fluid after the breakthrough.

However, a need still exists for further improvements in the properties and performance of the current RPPGs. First, the current RPPG products may be susceptible to being broken through by a fluid subsequently injected into the reservoir under sufficiently high pressure. A desirable solution to this problem would be to improve the elastic modulus of RPPGs to resist these high injection pressures. Second, when the fractures are vertical or have abnormally high vertical apertures, the RPPG particles may tend to preferentially precipitate into the lower part of the fractures or the bottom of large openings as a result of gravitational forces, which leaves the upper space open or less plugged due to a lower concentration or absence of particle gels. A desirable solution to this problem would be to improve the ability of the RPPG particles to remain in suspension in order to form a lattice structure within the fractures during formation of the bulk gel.

SUMMARY OF THE INVENTION

In one embodiment, there is provided a composition useful for controlling fluid flow. The composition comprises a quantity of fibers and a quantity of swellable particles comprising cross-linkable polymer chains and/or an assembling agent.

In another embodiment, there is provided a method of forming a gel formation in a target zone of a subterranean environment. The method comprises introducing the above composition into the subterranean environment.

In another embodiment, there is provided a method of forming the above composition. The method comprises: (i) dispersing the quantity of fibers in a carrier fluid and forming a homogenous mixture; and (ii) dispersing the quantity of swellable particles in the homogenous mixture, thereby causing at least a portion of the quantity of swellable particles to swell.

In another embodiment, there is provided a method of forming the above composition. The method comprises: (i) mixing the quantity of fibers and the quantity of swellable particles to form a homogenous mixture; and (ii) contacting the homogenous mixture with a carrier fluid, thereby causing at least a portion of the quantity of swellable particles to swell.

DETAILED DESCRIPTION

Figure 1:
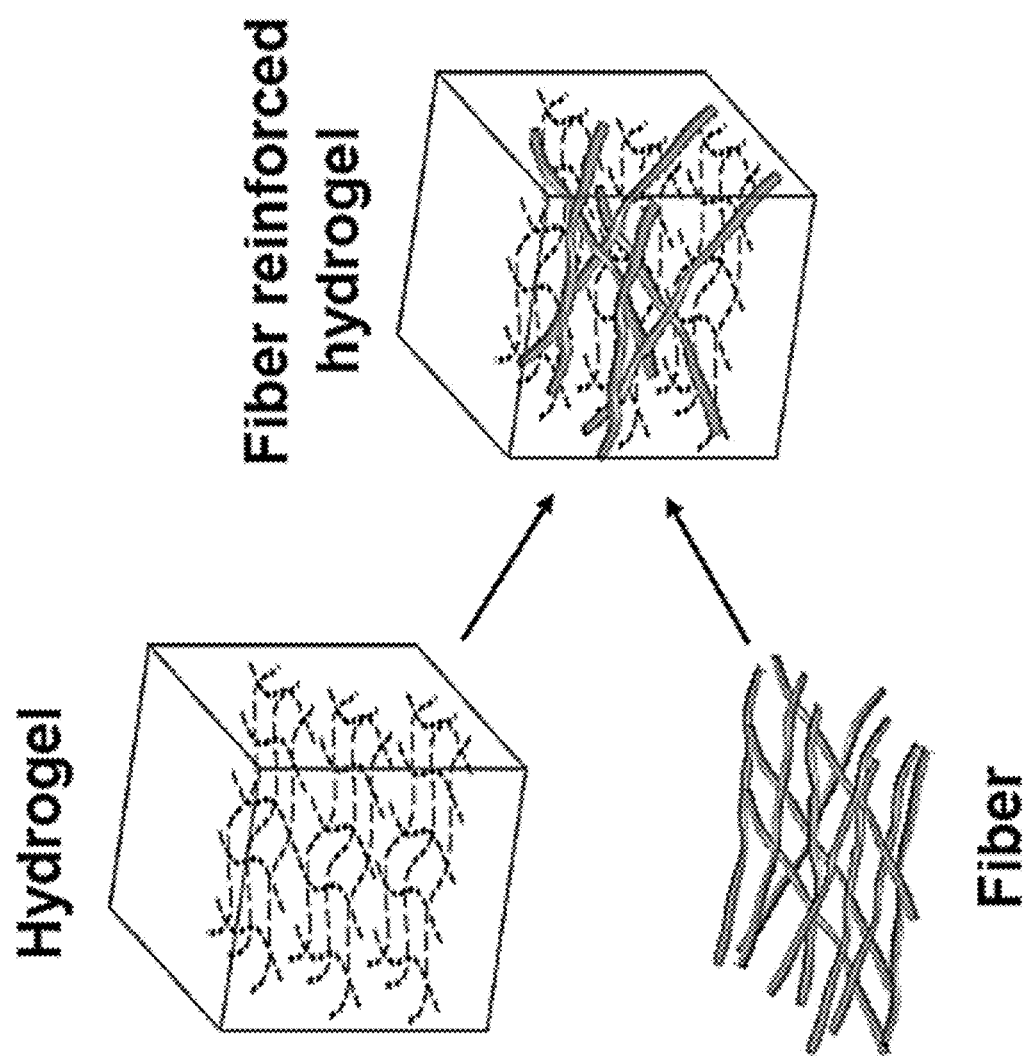
FIG. 1 is a schematic drawing showing a fiber-reinforced hydrogel in accordance with one embodiment of the present invention.

In the embodiments described herein, fibers have been successfully used to improve the property and performance of PPG and RPPG (re-crosslinking and/or re-associating) particle-containing compositions. The compositions may include particle-containing gel compositions that comprise re-crosslinking, re-associating, and/or self-healing components. The compositions generally comprise a quantity of fibers and a quantity of swellable particles, wherein the swellable particles comprise cross-linkable polymer chains and/or assembling agents. In certain embodiments, the swellable particles may comprise polymer chains (or polymer chain matrix) having assembling agent(s) interspersed therein. Thus, the quantity of fibers may be used with re-crosslinking particle gels and/or re-associating particles gels (i.e., particles that do not re-crosslink, per se, but re-associate), such as those described herein or others known in the art. In certain embodiments, the particle gel compositions are selected such that the gels reform bulk-like gel structure and do not remain as discrete particles. The fiber may be added during synthesis or during swelling of the compositions. For example, in certain embodiments, a particle-containing gel is synthesized with the addition of fiber to provide improved plugging efficiency, including higher pressure resistance to fluids, as compared to conventional preformed particle gel products. In certain such embodiments, the fiber-embedded particle gels comprise a mixture of any of a variety of PPG and RPPG particles (i.e., with various monomers/polymers, cross-linkers, initiators, additives, etc.) and a quantity of fibers dispersed in a carrier fluid. In certain other embodiments, dry fibers are physically mixed with PPG or RPPG particles before addition of a carrier fluid to provide improved structural characteristics of the resulting PPG or RPPG compositions upon addition of a carrier fluid (e.g., an injection liquid) and swelling of the particles.

As used herein, the term "fiber" refers to a natural or man-made elongated thread-like filament structure. In certain embodiments, the fiber comprises a natural fiber material such as vegetable fiber, wood fiber, animal fiber, mineral fiber, and/or biological fiber. In additional or alternative embodiments, the fiber comprises a man-made fiber material, such as semi-synthetic fiber (e.g., cellulose regenerated fibers) and synthetic fiber (e.g., metallic fibers, carbon fibers, silicon carbide fibers, fiberglass, mineral fibers, polymer fibers). In some embodiments, the fiber comprises a synthetic fiber material selected from the group consisting of polyethylene, polypropylene, nylons (aliphatic or semi-aromatic polyamides), and polyvinyl alcohol. However, it should be appreciated that any of a variety of fiber materials may be used in accordance with embodiments of the invention so long as the length and diameter of the fibers allow for ready dispersion (i.e., in the gel compositions) and/or mixing into the liquid carrier (e.g., water) with dry PPG or RPPG particles to form a pump-able mixture/dispersion.

In some embodiments, the fibers have an average length of about 0.1 mm to about 100 mm, from about 0.5 mm to about 50 mm, or from about 1 mm to about 25 mm. In certain embodiments, the fibers have an average diameter of about 0.1 µm to about 1,000 µm, from about 0.5 µm to about 500 µm, or from about 1 µm to about 100 µm. Generally, the fibers will have an aspect ratio (defined as the ratio of fiber length to diameter) of about 10 to about 1000. In some embodiments, the fibers comprise "short fibers" (i.e., discontinuous fibers) generally having an aspect ratio (defined as the ratio of fiber length to diameter) of about 10 to about 80 or about 20 to about 60. In other embodiments, the fibers comprise "long fibers" (i.e., continuous fibers) generally having an aspect ratio of about 100 to about 1000 or about 200 to about 500.

The swellable particles used in accordance with embodiments of the present invention may comprise any of a variety of PPG or RPPG receipts (including various monomers/polymers, cross-linkers, assembling agents, initiators, and additives). Exemplary PPG and RPPG particle compositions that may be used in embodiments of the present invention include those described in WO 2017/210486 and WO 2020/046939, each of which is incorporated herein in its entirety. The fiber-containing compositions in accordance with embodiments of the present invention generally comprise mixtures and dispersions comprising a quantity of swellable PPG and/or RPPG particles. The particles generally comprise polymers, crosslinkers, assembling agents, reagents, and/or optional additives, as described below.

In certain embodiments, the particles comprise polymerizable monomers and/or pre-made polymers, an assembling agent and/or a cross-linking agent, and optional other ingredients. In certain other embodiments, the particles are formed by polymerizing monomers and cross-linking agents to form a polymer matrix, drying the polymer matrix, and grinding the dry polymer matrix to form the swellable particles.

In other embodiments, the particles comprise a polymer formed from one or more starting monomers selected from the group consisting of acrylamides, sugars/saccharides, chloroprene, nitrile-containing compounds, sulfonates, acrylates, methacrylate, silicates, nano-clays and combinations of the foregoing.

In further embodiments, the particles comprise a polymer comprising a "re-cross-linking moiety" formulated and established by water-soluble monomers, which can be initiated by a free radical, cross-linkable at subterranean conditions, therein forming covalent, ionic, or coordination bonding. In certain embodiments, the monomer comprising a re-cross-linking moiety is a monomer possessing an anionic charge at neutral pH (7.0). Representative anionic monomers may include sodium, potassium, and ammonium salts of acrylic acid, methacrylic acid, maleic acid, itaconic acid, 2-propenoic acid, 2-methyl-2-propenoic acid, other water-soluble carboxylic acids, or combinations thereof. In some embodiments, the monomer comprising a re-cross-linking moiety comprises a water-soluble carboxylic acid. In other embodiments, the monomer comprising a re-cross-linking moiety can be nonionic, and possess no charge at a pH ranging from about 4 to about 10. Representative nonionic monomers can include, for example, N-isopropylacrylamide, N,N-diethylacrylamide, dimethylaminopropyl acrylamide, dimethylaminopropyl methacrylamide, acryloyl morpholine, hydroxyethyl acrylate, hydroxypropyl acrylate, hydroxyethyl methacrylate, hydroxypropyl methacrylate, dimethylaminoethylacrylate, dimethylaminoethyl methacrylate, maleic anhydride, N-vinyl pyrrolidone, vinyl acetate, N-vinyl formamide, or combinations thereof. In certain embodiments, the monomers comprising a re-cross-linking moiety can be a combination of anionic and nonionic monomers. In one or more embodiments, the preferred monomer for a re-association of free gel particles moiety is an acrylamide or a derivative thereof. In certain embodiments, the monomers comprising a re-cross-linking moiety can comprise sodium salts of acrylic acid, potassium salts of acrylic acid, ammonium salts of acrylic acid, methacrylic acid, maleic acid, itaconic acid, 2-propenoic acid, 2-methyl-2-propenoic acid, or combinations thereof.

In certain embodiments, the particles comprise a polymer formed from monomers comprising an "acid-resistance moiety," which exhibits insensitivities to a pH environment, particularly aqueous acidic conditions. In some embodiments, a monomer comprising an acid-resistance moiety comprises a sulfonate (i.e., 2-acrylamido-2-methyl-1-propanesulfonic acid sodium salt (AMPS)), sulfate, or phosphate monomers, which contain bulky groups, thereby facilitating chain spacing with steric hindrance. Moreover, these monomers may possess a low value of pKa, such as the sulfonate group that has a pKa value of 2.3. The representative monomers comprising an acid-resistant moiety may include a sulfonate, sulfate, or phosphate group; sodium or potassium vinylsulfonate and vinyl sulfate salts like sodium or potassium vinyl sulfates; phenyl vinyl sulfonate salts like sodium or potassium phenyl vinyl sulfate; and/or vinyl phosphate salts like sodium or potassium vinyl sulfate. In some embodiments, the monomer comprising an acid-resistance moiety comprises a monomer exhibiting a pka of less than 4, 3.5, 3, 2.9, 2.8, 2.7, 2.6, 2.5, or 2.4. In certain embodiments, the monomer comprising an acid-resistance moiety may comprise a water-soluble monomer that contains cationic pendant groups, such as diallyldimethylammonium chloride, (3-(methacryloylamino) propyl) trimethyl ammonium chloride, (2-(methacryloyloxy) ethyl) trimethyl ammonium chloride, vinylbenzyl trimethyl ammonium chloride, or combinations thereof. Additionally or alternatively, in various embodiments, the monomers with cationic pendant groups may include dimethylaminoethylacrylate methyl chloride quaternary salt, dimethylaminoethylacrylate benzyl chloride quaternary salt, dimethylaminoethylmethacrylate methyl chloride quaternary salt, or combinations thereof. In one or more embodiments, the monomer with an acid-resistance moiety may comprise 2-Acrylamido-2-methyl-1-propanesulfonic acid sodium salt (Na-AMPS).

In certain embodiments, the particles comprise a polymer formed from a monomer comprising a "$CO_2$-philic moiety," which comprises "$CO_2$ philes." As used herein, the term "$CO_2$ phile" refers to a molecular entity that is attracted to $CO_2$ molecules and has strong interactions with $CO_2$ that are more thermodynamically favorable than the interactions with polar solvents.

In some embodiments, the $CO_2$-philic monomers may comprise vinyl benzoate, benzyl vinyl formate, ethyl vinyl ether, methyl vinyl ether, vinylidene fluoride, lactic acid or lactic acid cyclic dimmer, glycolic acid or glycolide, hexamethylcyclotrisiloxane, 1H,1H,2H,2H-perfluorooctyl methacrylate, or combinations thereof. In one or more embodiments, the preferred $CO_2$-philic monomer is vinyl acetate. Studies have shown that poly(vinyl acetate) (PVAc) has reasonable solubility in $CO_2$ because of its amorphous structure, low melting point, and weak Lewis acid base interactions between the acetate group and $CO_2$. In certain embodiments, the monomer comprising the $CO_2$-philic segment is synthesized by free-radical polymerization in aqueous solutions. In such embodiments, the $CO_2$-philic monomers (e.g., vinyl acetate) may be water-soluble and may co-polymerize with the re-cross-linkable monomers and acid-resistant monomers. In various embodiments, the synthesis method of the $CO_2$-philic monomers is not limited and other polymerization routines such as ionic, ring-opening, or condensation polymerization can also be deployed. In some embodiments, the polymerization of the $CO_2$-philic monomers takes place within a different non-polar solvent, therein forming the configuration of a semi-inter penetrating network. In some embodiments, the $CO_2$-philes might be introduced by dispersion and may be incorporated in the form of a polymer, such as polyvinyl acetate.

However, in certain embodiments, the polymer does not include, and is substantially free of, $CO_2$-philic moieties ($CO_2$-philic moieties refer to molecular entities in the polymer that is attracted to $CO_2$ molecules and has strong interactions with $CO_2$ that are more thermodynamically favorable than the interactions with polar solvents). Specifically, in certain embodiments, the polymer matrix is substantially free of $CO_2$-philic monomers such as vinyl benzoate, benzyl vinyl formate, ethyl vinyl ether, methyl vinyl ether, vinylidene fluoride, lactic acid or lactic acid cyclic dimmer, glycolic acid or glycolide, hexamethylcyclotrisiloxane, 1H,1H,2H,2H-perfluorooctyl methacrylate, and vinyl acetate.

The monomers can be selected to create a homopolymer(s), a copolymer(s), and both a homopolymer(s) and a copolymer(s). Polymerizing can be carried out using conventional polymerization techniques, including those selected from the group consisting of solution polymerization, emulsion polymerization (including inverse emulsion polymerization), and suspension polymerization. It will be appreciated that this polymerization allows one to custom synthesize the polymer (including making desired chemical modifications). In an alternative embodiment, the polymer can be a commercial product or "off-the-shelf" polymer as well, with the assembling agent being incorporated into the polymer chain network.

In certain embodiments, the polymer chains (backbone) of the polymer matrix comprise a homopolymer, which is formed from a single type of monomer. In some embodiments, the monomer is an amide monomer (i.e., a monomer comprising an amide functional group). In certain embodiments, the amide monomer is selected from the group consisting of acrylamide, methacrylamide, N-methylacrylamide, N-tert-butylacrylamide, N-ethylacrylamide, N-hydroxyethyl acrylamide, N-isopropylacrylamide, N, N-diethylacrylamide, dimethylaminopropyl acrylamide, dimethylaminopropyl methacrylamide, acrylamide, N-isopropylacrylamide, N,N-dimethylacrylamide, N,N-diethylacrylamide, dimethylaminopropyl acrylamide, dimethylaminopropyl methacrylamide, N-vinyl formamide. Particularly preferred nonionic amide monomers include acrylamide, N-methylacrylamide, N,N-dimethylacrylamide, and methacrylamide. Advantageously, amide monomers in the polymer matrix can react with the re-cross-linking agent through transamidation as shown in the reaction scheme below.

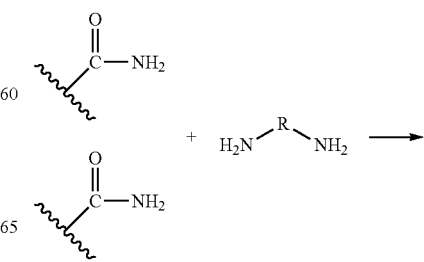

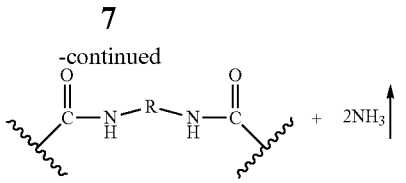

In other embodiments, the polymer chains (backbone) of the polymer matrix comprise a copolymer, which is formed from two or more types of monomers. In certain such embodiments, at least one of the two or more types of monomers comprises a monomer that can react with the re-cross-linking agent, such as under appropriate stimulus (e.g., high temperature) at subterranean conditions. In some embodiments, the at least one monomer comprises a sulfonate, sulfate, or phosphate monomer. In other embodiments, the monomer comprises sulfonate, sulfate, or phosphate group(s); sodium or potassium vinylsulfonate and vinyl sulfate salts like sodium or potassium vinyl sulfates; phenyl vinyl sulfonate salts like sodium or potassium phenyl vinyl sulfate; and/or vinyl phosphate salts like sodium or potassium vinyl sulfate. In particularly preferred embodiments, the monomer is 2-acrylamido-2-methyl-1-propanesulfonic acid sodium salt (Na-AMPS).

In some embodiments, the at least one of the two or more monomers comprises a water-soluble monomer that contains cationic pendant groups, such as diallyldimethylammonium chloride, (3-(methacryloylamino) propyl) trimethyl ammonium chloride, (2-(methacryloyloxy) ethyl) trimethyl ammonium chloride, and/or vinylbenzyl trimethyl ammonium chloride. In other embodiments, the alternative monomers with cationic pendant groups include dimethylaminoethylacrylate methyl chloride quaternary salt, dimethylaminoethylacrylate benzyl chloride quaternary salt, and/or dimethylaminoethylmethacrylate methyl chloride quaternary salt.

In other embodiments, the at least one of the two or more monomers comprises a nonionic monomer. Representative nonionic monomers include hydroxyethyl acrylate, hydroxypropyl acrylate, hydroxyethyl methacrylate, hydroxypropyl methacrylate, dimethylaminoethylacrylate (DMAEA), and dimethylaminoethyl methacrylate (DMAEM). Generally, C8-C22 backbones can be employed. Exemplary hydrophobic monomers include the higher alkyl esters such as octyl, decyl, dodecyl, tridecyl, tetradecyl, octadecyl, etc. of α,β-ethylenically unsaturated carboxylic acids, such as acrylates and methacrylates. Also included are alkyl esters having 8 to 22 carbon atoms with ethylenically unsaturated carboxylic acids such as maleic anhydride, fumaric acid, itaconic acid and aconitic acid, alkylaryl esters of ethylenically unsaturated carboxylic acids such as nonylo-phenyl acrylate, nonyl-α-phenyl methacrylate, dodecyl-α-phenyl acrylate and dodecyl-α-phenyl methacrylate; N-alkyl, ethylenically unsaturated amides such as N-octadecyl acrylamide, N-octadecyl methacrylamide, N,N-dioctyl acrylamide and similar derivatives thereof, α-olefins such as 1-octene, 1-decene, 1-dodecene and 1-hexadecene; vinyl alkylates wherein alkyl has at least 8 carbons such as vinyl laurate and vinyl stearate; vinyl alkyl ethers such as dodecyl vinyl ether and hexadecyl vinyl ether; N-vinyl amides such as N-Vinylpyrrolidone, N-vinyl lauramide and N-vinyl stearamide; and alkyl aromatics such as t-butyl styrene or t-butyl phenyl.

The particles may also comprise one or more assembling agent(s) and/or cross-linking agent(s). The assembling agent(s) or cross-linking agent(s) may be selected based on the particular application for the particle gel composition. For example, one or more assembling agents may be used when a re-associating particle gel composition is desired. When present, the assembling agent acts as an additive (i.e., a separate chemical entity) that aids the polymer gel mechanical response to provide an auto-adherent, self-healing property in the polymer gel. In certain embodiments, the assembling agent is selected to be one that associates with the final polymer in situ, thus producing a gel. Additionally, the type of assembling agent can be used to control the re-assembly time. It is preferred that the assembling agent does not react with the above monomers during the manufacture of the particles. Preferably, assembling agents have positively and/or negatively charged groups and can be either single component or multiple components. The most preferred assembling agents are selected from the group consisting of polyacrylamide, one of the multivalent Group III-VII transition metal molecules, methylene bisacrylamide, polyethylene glycol, dimethacrylate, phenol-formaldehyde, diallylamine, triallylamine, divinyl sulfonate, diethylene glycol diallyl aldehydes, diethyeneglycol diallyl ether, polyethyleneimine, dichlorophenol, benzoyl peroxide, di-tert-butyl peroxide, dibutyl hydrogen phosphite (DBHP), $C_8$-$C_{22}$ alkanes, and mixtures thereof. Particularly preferred assembling agents are selected from the group consisting of Cr, Zr, Co, and Al molecules or ions, organic compounds such as those selected from the group consisting of methylene bisacrylamide, polyethylene glycol, dimethacrylate, phenol-formaldehyde, diallylamine, triallylamine, divinyl sulfonate, diethylene glycol diallyl aldehydes, diethylene glycol diallyl ether, polyethyleneimine, and combinations of the foregoing. The foregoing agents can be provided directly, or a source of that particular assembling agent can be provided. Examples of preferred sources of assembling agents include those selected from the group consisting of zirconium-acetate, chromium-acetate, aluminum acetate, aluminum citrate, cobalt acetate, zirconyl chloride, and mixtures of the foregoing.

In certain embodiments, crosslinking agent(s) may be used when a cross-linkable or re-cross-linkable particle gel composition is desired. As examples, the cross-linking agent(s) may comprise any reagent(s) that can connect the polymer chains via cross-linkings, which take place simultaneously with the formation of polymer chains. In various embodiments, the cross-linking agent is a divinyl monomer that can copolymerize with vinyl monomers and form cross-linking points during the propagation of polymers. As described in this section, the cross-linking denotes a chemical cross-linking, namely permanent, covalent bonding. Representative cross-linkers may include, for example, methylene bisacrylamide, diallylamine, triallylamine, divinyl sulfone, diethyleneglycol diallyl ether, or combinations thereof. In one or more embodiments, the preferred cross-linker is methylene bisacrylamide (MBA). In certain embodiments, the cross-linking agent comprises diacrylyl tertiary amide, diacrylylpiperazine, diallyltartardiamide, dihydroxyethylene-bis-acrylamide, and bis-acrylylcystamine, trimethylolpropane trimethacrylate, propyleneglycol triacrylate, tripropyleneglycol diacrylate, allyl methacrylate, triethyleneglycol dimethacrylate, tetrahydrofurfuryl methacrylate, trimethylolpropane triacrylate, or combinations thereof. In one or more embodiments, the cross-linking agent may comprise a multifunctional cross-linker such as pentaerythritol triacrylate, 1,5 pentane diol dimethacrylate, pentaerythritol triallylether, or combinations thereof.

In certain embodiments, the cross-linking agent may comprise any reagent(s) that can react with the "re-cross-linking moiety," therein generating self-healing and discrete particle reassociations, to thus produce a bulk gel at subterranean conditions comprised of discrete polymer gel particles that associate to form a gel possessing bulk gel properties. More particularly, such cross-linking agents are able to react with the side groups of the "re-cross-linking moiety" and thereby form coordination bonding, covalent bonding, ionic bonding, and/or physical tackifying. In other words, the polymer matrix may comprise a plurality of cross-linkable polymer chains and at least a portion of the cross-linking agent(s) may be interspersed among the cross-linkable polymer chains. Consequently, the cross-linking agent may be capable of associating with the polymer chains upon exposure to a fluid capable of swelling the polymer matrix. Such cross-linking agents can be either a single component or multiple components, which comprise multiple cross-linkers together as a combination. In certain embodiments, the cross-linking agent comprises a chelate comprising a multivalent metal ion (e.g., $Al^{3+}$, $Fe^{3+}$, $Cr^{3+}$, $Ti^{4+}$, $Sn^{4+}$, or $Zr^{4+}$) and a ligand such as acetates, tartrates, malonates, propionates, benzoates, and/or citrates. The ligands may be organic ions complexed with a multivalent metal ion via coordination bonding, which can affect the kinetic rate of re-cross-linking. These cross-linkers can react with carboxyl groups or other reactive groups that are pendant on the "re-cross-linking moiety," and thereby a bulk gel will be obtained in-situ. Representative cross-linking compounds can include, for example, Cr(III)-acetate, Cr(III)-propionate, Zr(IV)-acetate, Zr(IV)-lactate, or combinations thereof. In one or more embodiments, the preferred cross-linking agent is Zr(IV)-acetate. In certain embodiments, the cross-linking agent is polymeric component such as polyethyleneimine, poly-L-lysine, poly-F-lysine, polyallylamine, polyvinylamine, or combinations thereof. These cross-linkers can connect neighbored amide groups via transamidation.

In some embodiments, the cross-linking agent may comprise a "re-cross-linking agent," which refers to any latent reagent(s) that can react with the polymer matrix, thereby generating self-healing and discrete particle reassociations, to thus produce a bulk gel at subterranean conditions comprised of discrete polymer gel particles that associate to form an entirety possessing bulk gel properties. The re-cross-linking agent is generally embedded within the polymer matrix RPPG is synthesized. At higher temperature subterranean conditions, the re-cross-linking agent is able to react with the sidegroups of the polymer matrix, which forms covalent bonding. In some embodiments, the re-cross-linking agent can react with the carboxylate group or amide group among the matrix wherein the cross-linking take place through transamidation.

The re-cross-linking agent can be either a single component or multiple components, which comprise multiple cross-linkers together as a combination. The re-cross-linking agent may be an oligosaccharide or polysaccharide rich in amino groups, wherein the amino groups are at least 75, 80, 85, 90, or 95 percent primary amines. The oligosaccharides and polysaccharides can be either natural raw materials or functionalized amino derivatives.

In some embodiments, the re-cross-linking agent is an aminated alginate, that is alginic acid functionalized with primary amine. In certain such embodiments, the alginates are unbranched polysaccharides comprising (or consisting of) β-D-mannuronate (M) and α-L-guluronate (G). In particular embodiments, the alginates comprise sequences of M (M-blocks), G (G-blocks), and residues interspersed with MG sequences (MG-blocks). The alginates can be obtained from both algal and/or bacterial sources. Preferably, the aminated alginate is obtained via the grafting or Hofmann reactions. However, in alternative embodiments, an alternative pathway to produce the animated alignate can involve reductive amination.

In certain embodiments, the re-cross-linking agent is chitosan or modified chitosan functionalized with primary amine. Chitosan is a linear polymer occurring naturally only in certain fungi Mucoraceae and is chemically comprised of glucosamine and N-acetylglucosamine monomers linked through β-(1-4) glycosidic linkages. One exemplary chitosan modification can be achieved via the sequential phthaloylation, nucleophilic substitution reaction, and dephthaloylation.

In some embodiments, the re-cross-linking agent is a dextran amine, which is the dextran functionalized with primary amine. Dextran is a complex branched glucan, namely the branched poly α-d glucosides of microbial origin having predominantly glycosidic bonds. The polymer main chain consists of α-1,6 glycosidic linkages between glucose monomers, with branches from α-1,3 linkages. This characteristic branching distinguishes a dextran from a dextrin, which is a straight chain glucose polymer-tethered by α-1,4 or α-1,6 linkages. In certain embodiments, the aminated dextran is obtained via the reductive amination involved oxidization and imine reduction. Alternatively, the aminated dextran is obtained by deploying non-reductive amination.

In certain embodiments, the re-cross-linking agent can be aminated cellulose, that is cellulose functionalized with primary amine. Cellulose is a polysaccharide consisting of a linear chain of several hundred to many thousands of β (1→4) D-glucose units. Preferably, the aminated cellulose is obtained through a Staudinger reaction or reductive amination.

In other embodiments, the re-cross-linking agent is aminated guaran, that is functionalized with primary amine. Guaran, also known as guar gum, is a galactomannan polysaccharide extracted from guar beans, which is an exo-polysaccharide composed of the sugars galactose and mannose. The backbone is a linear chain of β(1→4) linked mannose residues to which galactose residues are (1→6) linked at every second mannose, forming short side-branches. Preferably, the aminated guar gum is obtained via carboxymethylation and coupling or amination in basic condition with the presence of aminating agent.

In further embodiments, the re-cross-linking agent is an aminated heparin, that is the heparin functionalized with primary amine.

In certain embodiments, the re-cross-linking agent is a complex form of amino saccharide and a multivalent metal ion. The multivalent metal ion can be salts of, but not limited to, $Al^{3+}$, $Fe^{3}$, $Cr^{3+}$, $Ti^{4+}$, $Sn^4$, or $Zr^4$. The ligands can be natural raw materials or the functionalized amino-saccharide. The ligands herein can be the oligosaccharide or polysaccharide that is rich in amino groups, particularly where the amino groups are predominantly primary amines. The ligands complexed with multivalent metal ion via coordination bonding affect the kinetic rate of re-cross-linking. Exemplary ligands include chitosan, aminated chitosan, aminated alginate, aminated dextran, aminated cellulose, aminated heparin, and aminated guaran.

In some embodiments, the concentration of assembling agent(s) and cross-linking agent(s) in the particles can be used to control the gelation properties in the final product composition. That is, the assembling agent and/or cross-linking agent concentration can be used to control the re-assembled gel strength (for robust gels) or viscosities (for weak gels). This typically results in a preferred weight ratio of monomers to assembling/cross-linking agent is from about 2:1 to about 200:1, more preferably from about 5:1 to about 50:1, and even more preferably from about 5:1 to about 15:1. Such a ratio will typically result in monomers present at levels of from about 15 to about 50% by weight, preferably from about 23 to about 50% by weight, and more preferably from about 23 to about 30% by weight, based upon the weight of total solids utilized taken as 100% by weight. Furthermore, this will typically result in the total assembling/cross-linking agent being present at levels of from about 0.5 to about 6% by weight, preferably from about 1.25 to about 6% by weight, and more preferably from about 3.5 to about 6% by weight, based upon the weight of all ingredients utilized taken as 100% by weight.

In certain embodiments, a polymerization initiator will also be present during the particle synthesis process. The initiator will be selected based on the monomers being utilized and the polymerization process selected, but typical initiators include those selected from the group consisting of persulfates (e.g., ammonium persulfate, potassium persulfate), N,N,N',N'-tetramethylethylenediamine, acyl peroxide, hydrogen peroxide, dialkyl peroxides, ester peroxide, ketone peroxide, azo compounds, and mixtures of thereof. Furthermore, the amount of initiator utilized will typically be from about 0.01 to about 0.2% by weight, preferably from about 0.02 to about 0.1% by weight, and more preferably from about 0.02 to about 0.05% by weight, based upon the weight of the monomers utilized taken as 100% by weight.

A polymerization accelerator can optionally be present during the particle synthesis process. Typical accelerators include those selected from the group consisting of sodium thiosulfate (STS), sodium bisulfite (SBS), sodium metabisulfite (SMS), thiomalic acid, nitrilotriacetic acid, glycerol, ascorbic acid, and mixtures thereof. Furthermore, the amount of accelerator utilized will typically be from about 0.01 to about 0.2% by weight, preferably from about 0.02 to about 0.1% by weight, and more preferably from about 0.02 to about 0.05% by weight, based upon the weight of all ingredients utilized taken as 100% by weight.

The particles may also include one or more additives, which can be mixed into the system before the synthesis stage or subsequently added to the particles. In certain embodiments, the additives are ones that coordinate/associate with the formed polymer (e.g., to form hydrogen bond/Van der Waals associations). Other additives can interpenetrate the polymer chains, while others can simply be mixed into the system without reaction with other components. For instance, the particles can be pre-treated by surfactant or a surface coating material before mixing into reservoir fluid.

Exemplary optional ingredients or additives include tackifiers, plasticizers, polymers, aromatic compounds, polysaccharides, deoxidants, adjustors of gelant (e.g., $NH_4Cl$, NaOH, carbamide), clays (e.g., montmorillonite, bentonite), nanoclay, initiators, stabilizers (e.g., tetramethylethylenediamine, resorcinol, organic complexing agents, $NaN_3$), celluloses, epoxy resins, silica, silicon oxide, aluminum oxide, carbon nanotubes, graphene, ethylenediaminetetraacetic acid (EDTA), and mixtures thereof. Other optional additives include nanoparticles (e.g., hydrophilic silica nanoparticles), oxygen scavengers (i.e., reducing agents which can remove the dissolved oxygen from an aqueous solution through a gradual process of a redox reaction), chelating agents, thickening agents, nano- or micro-fibers (similar to or different than those used in the dispersions described herein) and biocides.

In one or more embodiments, the particles may be prepared by polymerizing the monomers described herein in the presence of one or more assembling agents, cross-linking agents, fibers, and/or optional additives. The polymerization occurs in a solvent system, preferably an aqueous solvent system. In certain embodiments, the solvent system comprises an aqueous solvent selected from the group consisting of water and brine/saline solutions (e.g., NaCl, $CaCl_2$, $AlCl_3$), although other solvents can also be used. Regardless, the solvent system will typically be present at levels of from about 50 to about 70% by weight, preferably from about 65 to about 70% by weight, and more preferably from about 66.7 to about 70% by weight, based upon the total weight of all ingredients utilized taken as 100% by weight. Of course, the solids levels would be the balance of the foregoing percentages. During the polymerization process, the monomers polymerize to form a plurality of cross-linkable polymer chains and/or polymer chains having interspersed assembling agent(s). The resulting polymers can be one or more homopolymer, one or more copolymer, or a mix of homopolymers and copolymers.

Typical polymers for use in the invention include those selected from the group consisting of polymers or copolymers of hydrolyzed polyacrylamide, polyacrylamide, chloroprene rubber, nitrile rubber, hydrophilic resin sulfonate, xanthan, guar, acrylates or methacrylates (e.g., lauryl methacrylate, stearyl methacrylate) silicates, acrylamides (e.g., N, N-dimethylacrylamide), and combinations of the foregoing.

During polymerization, the assembling agent(s), if present, release free radicals after being dissolved in the solvent, thus causing them to associate with the polymer chains as they are formed. The assembling agent and any other ingredients end up being substantially uniformly distributed within the entangled (but not cross-linked) polymer chain network. Thus, all the compositions will be proportionally released at the same time in the reservoir conditions (e.g., reservoir temperature, formation liquid pH or salinity, formation electrical property), and the reassembled gel quality can be better controlled.

Although an exemplary method of forming the particles is described herein, it should be understood that other methods of forming the particles (or variations of the method described herein) may be used in accordance with embodiments of the present invention. Regardless of the method, the resulting particles will generally be swellable and comprise cross-linkable polymer chains and/or assembling agents.

The resulting particles could be in four forms: turbid liquid, emulsions, wet particles, and dry particle gel system. The particle composition can be synthesized either as a bulk gel and then be dried and ground into micro-, or millimeter-sized particles, or as a micro-particle, submicro-particles, or nano-particles through emulsion polymerization. For solid particles, the particle size could be ranged from nanometer to millimeter. Typically, the average particle size (using the largest average dimension) of the particles is from about 10 nm to about 10 mm, preferably from about 800 nm to about 10 mm, more preferably from about 0.1 mm to about 5 mm, and even more preferably from about 1 mm to about 4 mm. The preferred weight ratio of polymers to assembling/cross-linking agent(s) is from about 2:1 to about 200:1, more preferably from about 5:1 to about 50:1, and even more preferably from about 5:1 to about 15:1.

Compositions comprising the quantity of fibers and the quantity of swellable particles may be prepared using a variety of methods in accordance with embodiments of the present invention. In one or more embodiments, a bulk gel composition may be prepared having both the fiber and particles embedded inside the gel during the synthesis process. In certain such embodiments, the quantity of fiber is first dispersed in the liquid carrier, with the swellable particles subsequently added to the dispersion. The dispersion can then be gelatinized to form the bulk gel composition. The embedded fiber is preferably uniformly distributed in the gel composition. The resulting gel composition has improved elastic modulus as compared to RPPG gels without fiber. This provides for improved plugging efficiency and better flushing resistance as compared to prior gel compositions. The fiber also provides reduced density compared to prior gels to assist the composition to be better placed in large openings.

In one or more embodiments, the swellable particles may be combined with the quantity of dry fibers, for example a homogenous mixture of particles and fibers, and subsequently added to, and dispersed in, a carrier liquid prior to use. The fibers improve the dispersion of the particles as compared to prior particle dispersions without added fibers and form a more complete plugging performance in vertically oriented fractures, fractures with abnormally high vertical aperture, or the other large openings, to prevent gravitational convection of the particles and poor swelling dynamics. In certain such embodiments, the quantity of fibers is physically mixed the quantity of swellable particles in the presence of a carrier fluid, such a well injection liquid or other solvent system. The fibers are preferably uniformly dispersed in the mixture, for example by shear dispersion stirring.

Carrier fluids used in accordance with embodiments of the present invention can be used to form dispersions comprising the fibers and particles. In certain embodiments, the carrier fluid can also be used to cause the particles to swell, associate, and/or cross-link, depending on the specific application for the composition. In certain embodiments, the carrier fluid comprises a solvent system, preferably an aqueous solvent system. In certain embodiments, the aqueous solvent system comprises freshwater, brine, or other injection liquid. In certain embodiments, the solvent system comprises a brine solution having a salt concentration of about 0.1% to about 25% by weight, preferably about 0.5% to about 10% by weight, and more preferably about 1% to about 5% by weight. In certain embodiments, the salt in the brine solution comprises NaCl, $CaCl_2$), and/or $AlCl_3$).

The concentration of fibers, swellable particles, carrier fluid, and any additives can vary depending on the particular components used and the particular application for the composition. In certain embodiments, the composition comprises the quantity of fibers and the quantity of swellable particles at a weight ratio of about 1:1000 to about 10:1, preferably about 1:500 to about 1:1, and more preferably about 1:100 to about 1:10 (fibers:particles). Regardless whether the fibers are added during gel synthesis or whether the dry fibers and particles are mixed prior to gel formation, in use the compositions will generally comprise (consist of, or consist essentially of) a quantity of fibers and a quantity of swellable particles dispersed in a carrier liquid. In certain such embodiments, the composition may comprise about 0.01% to about 20% by weight, preferably about 0.1% to about 10% by weight, and more preferably about 0.2% to about 2% by weight of the quantity of fibers. In certain embodiments, higher amounts of fiber may be used. However, for reservoir well applications, higher levels of fiber will plug the injection pump and thus should be avoided. In certain embodiments, the composition may comprise about 0.1% to about 40% by weight, preferably about 1% to about 30% by weight, and more preferably about 5% to about 20% by weight of the quantity of swellable particles. In certain embodiments, the composition may comprise about 2% to about 50% by weight, preferably about 5% to about 40% by weight, and more preferably about 10% to about 30% by weight of the quantity of total solids (i.e., including the fibers and swellable particles). The remainder of the composition will generally comprise the carrier fluid, such as an injection liquid or other solvent system. In certain embodiments, the composition comprises at least 50% by weight, preferably at least 60% by weight, more preferably at least 70% by weight, and even more preferably at least 80% by weight of the carrier liquid.

In the compositions and methods described herein, the fiber acts as a support scaffold for the particles, which provides considerable suspension for the particles and prevents the particles from sedimentation. Thus, the compositions having particles and fibers suspended therein swells evenly and re-cross-links and/or re-associates with uniform structure and optimum integrity. In addition, compositions having RPPG particles with re-cross-linked polymers and embedded fiber have a higher elastic modulus and an improved plugging performance than compositions without fiber.

In use, the compositions can be dispersed by water, brine, or other aqueous solvent or injection liquid and pumped into formation. As noted above, the composition may comprise particles or gels having fibers embedded therein, or the fibers may be separately added to RPPG particles prior to use. For example, dry fibers may be added to RPPG particles that are co-dispersed into water, formation water, or brine, as an injectable phase that is pumped into reservoirs as a means to better control fluid flow through abnormal large opening features, such as vertical or inclined fractures, void conduits, and so on. The RPPG compositions act as a barrier to fluid flow and, upon proper placement in such a feature, will swell with water and occlude fluid flow through the RPPG-filled feature. The fibers within the compositions can maintain the RPPG particles uniformly distributed in whole large openings, with no or little settling of the particles due to gravity, until the bulk gel is formed. This addresses the problem with prior RPPG compositions without dispersed fibers, which were do not have equal access to the water phase of the injected dispersion and therefore suffer non-uniform swelling with water. The fibers maintain proper spacing and access to all surfaces of the RPPG particles to the water phase and promote proper, uniform swelling and feature filling as intended by the RPPG treatments and control of underground water flooding operations.

During their transport through formation, all of the components in the composition will generally move together. After placement in the target zone, the particles accumulate in large fractures, channels, and/or other highly-permeable features will proportionally release all compositions from the particles under reservoir conditions after a designed time, which can avoid the problems of composition variation and/or non-uniform distribution.

Upon exposure to water, brine (e.g., aqueous NaCl, $CaCl_2$), or $AlCl_3$), or other solvents and injection fluids, the particles begin to swell. It is preferred that swelling commence within about 0.1 seconds to about 300 seconds, and preferably within about 0.1 seconds to about 10 seconds of contact with the target fluid. The particles will swell to a size that is at least about 20 times, preferably at least about 40 times, and more preferably at least about 100 times their initial average particles sizes. In some embodiments, the particles will swell to a size that is from about 5 times to about 200 times, preferably from about 20 times to about 200 times, and more preferably from about 30 times to about 100 times their initial average particles sizes. It is preferred that these swelling ranges be reached within a time period of from about 60 minutes to about 240 hours, preferably from about 60 minutes to about 300 minutes, and preferably from about 120 minutes to about 180 minutes of contact with the target fluid.

As the particles swell, the polymer chain network is relaxed from its entangled state. This relaxing exposes the assembling agent(s) and/or cross-linking agent(s), which enables interaction. The package can be suitable to reassociate at any temperatures above 20° C., preferably above 50° C. (for example, with high-temperature RPPG particles). During this swelling, the particles associate, combine together, and form a bulk gel. That is, the released compositions will stick all particles together to form a thermostable strong gel. "Thermos-stable" means that the assembled gels are physically and chemically stable and will be minimally or not at all degraded by reservoir environments. "Reservoir environments" refers to conditions related to a true petroleum ground source reservoir, including reservoir temperature, formation liquid pH or salinity, and formation electrical property.

In certain embodiments, the compositions may be used in methods of altering or controlling a fluid present in a subterranean environment, such as wells, pipelines, pipelines, or fractures. Generally, the method may involve introducing the composition into a subterranean environment, optionally via a carrier fluid such as brine or water, and allowing the composition to contact a particular fluid, causing the particles within the composition to swell. In one or more embodiments, the carrier fluid can be selected from the group consisting of water, brine solvent (comprising NaCl, $CaCl_2$), and/or $AlCl_3$), and other fluids that cause the composition to swell. Upon contacting the fluid, an assembling agent or cross-linking agent may associate with the polymer chains, causing the swelling. This swelling indicates the association, cross-linking, and/or reassembly of the polymer chains or polymer matrix. In other words, the swelling may cause the particles in the composition to associate and/or cross-link, combine together, and form a bulk gel. In certain embodiments, the compositions may be used in $CO_2$ flooding, $CO_2$ huff-puff, or Water-Alternative-Gas (WAG), $CO_2$ storage, geotherm, pollution control, or other hydrocarbon recovery applications.

In one or more embodiments, the compositions of the present invention advantageously utilize the fibers as reinforcing agents within the compositions to provide a stronger, particulate plugging agent for improved underground fluid flow control. Short fibers, in particular, added to hydrogel materials reinforce the particles and engender added particle strength to traditionally weak, water swollen hydrogel polymers. The incorporation of fibers into hydrogels does complicate the hydrogel production technology, and creation of the particles from synthesized bulk gel causes recovery of the particles to be more difficult as fibers will protrude from the drying/dried gel particles. However, the methods described herein achieve the desired goals of reinforcing a re-cross-linked/re-associated hydrogel plug in underground features and supports proper rehydration of RPPG particles with water or brine to better and more completely fill underground void space conduits.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than or equal to about 10" (with no upper bounds) and a claim reciting "less than or equal to about 100" (with no lower bounds).

EXAMPLES

The following examples set forth synthesis and testing of compositions comprising fibers and swellable particles. It is to be understood, however, that these examples are provided by way of illustration and nothing therein should be taken as a limitation upon the overall scope of the invention.

Example 1

Polypropylene fiber with a length of 0.5 inch was mixed with 1 wt % NaCl brine and was stirred to form a uniform suspension mixture. Dry RPPG particles comprising polyacrylamide and zirconium (IV) with a diameter 1-2 mm were swollen in the fiber dispersed brine. The concentrations of fiber and RPPG were 0.4 wt % and 10 wt %, respectively. The system was stirred for 5 minutes, when the partially swollen RPPG and fiber uniformly dispersed in the brine. The resulting mixture is shown schematically in FIG. 1.

Figure 2:
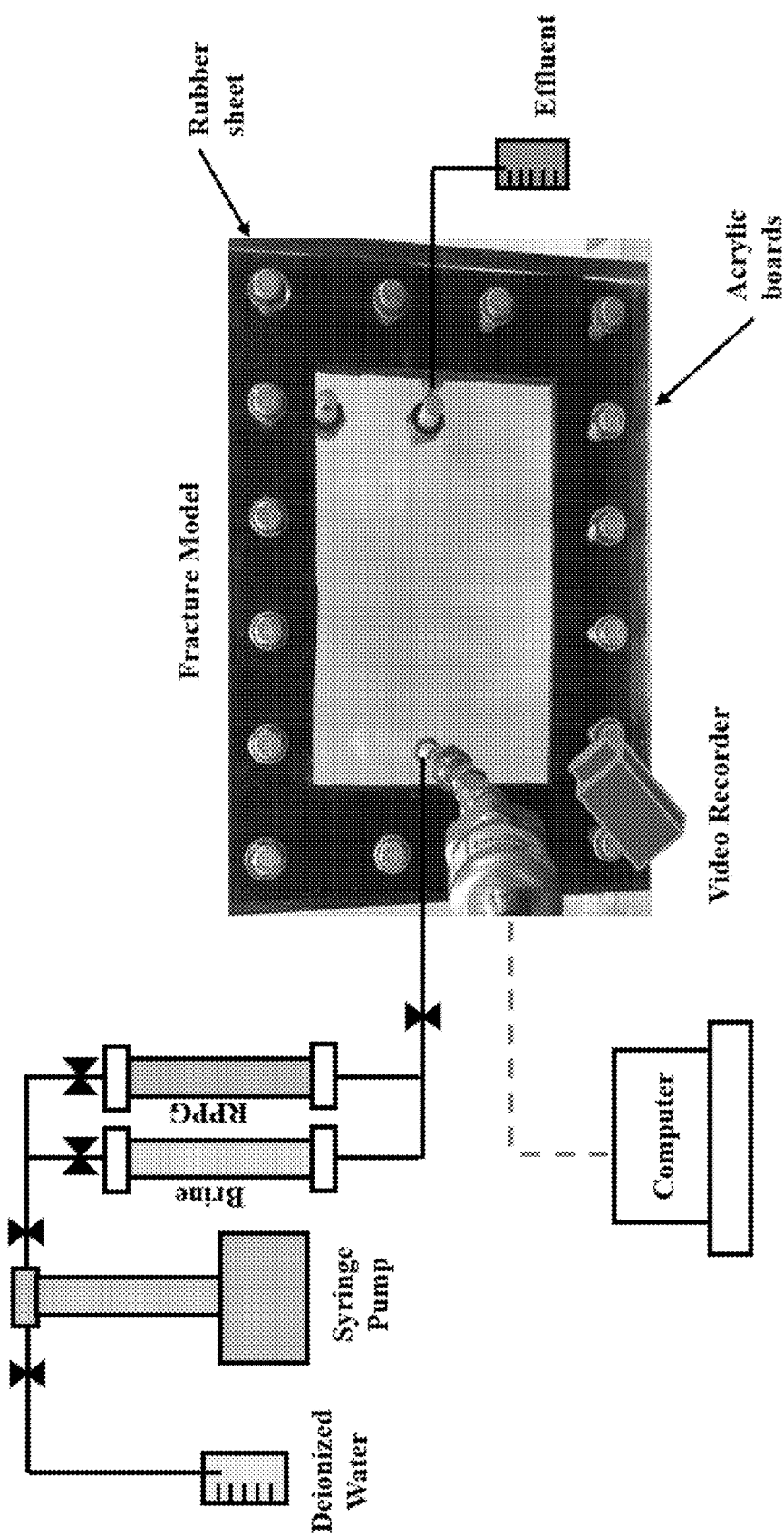
FIG. 2 is a schematic diagram of a fracture model testing apparatus.

Then the mixture was injected at 5 mL/min into a transparent, non-leakage fracture model to inspect the behavior of injection and water-plugging. The fracture model and core flooding setup are shown schematically in FIG. 2. The dimensions of the fracture were 8.3 in (L)×5.0 in (H)×0.5 in (W). A controlled experiment without using fiber that had all other procedures consistent was conducted for comparison.

The 0.8 fracture volume (FV) of mixture, including partially swollen RPPG and water, was injection into the model in both experiments. Then the fracture model was sealed and aged at room temperature for four days (much longer than the re-cross-linking time) for RPPG swelling and re-cross-linking. The RPPG volume change during the shut-in time was shown in FIG. 3, where the red lines highlighted the gel front.

Figure 3:
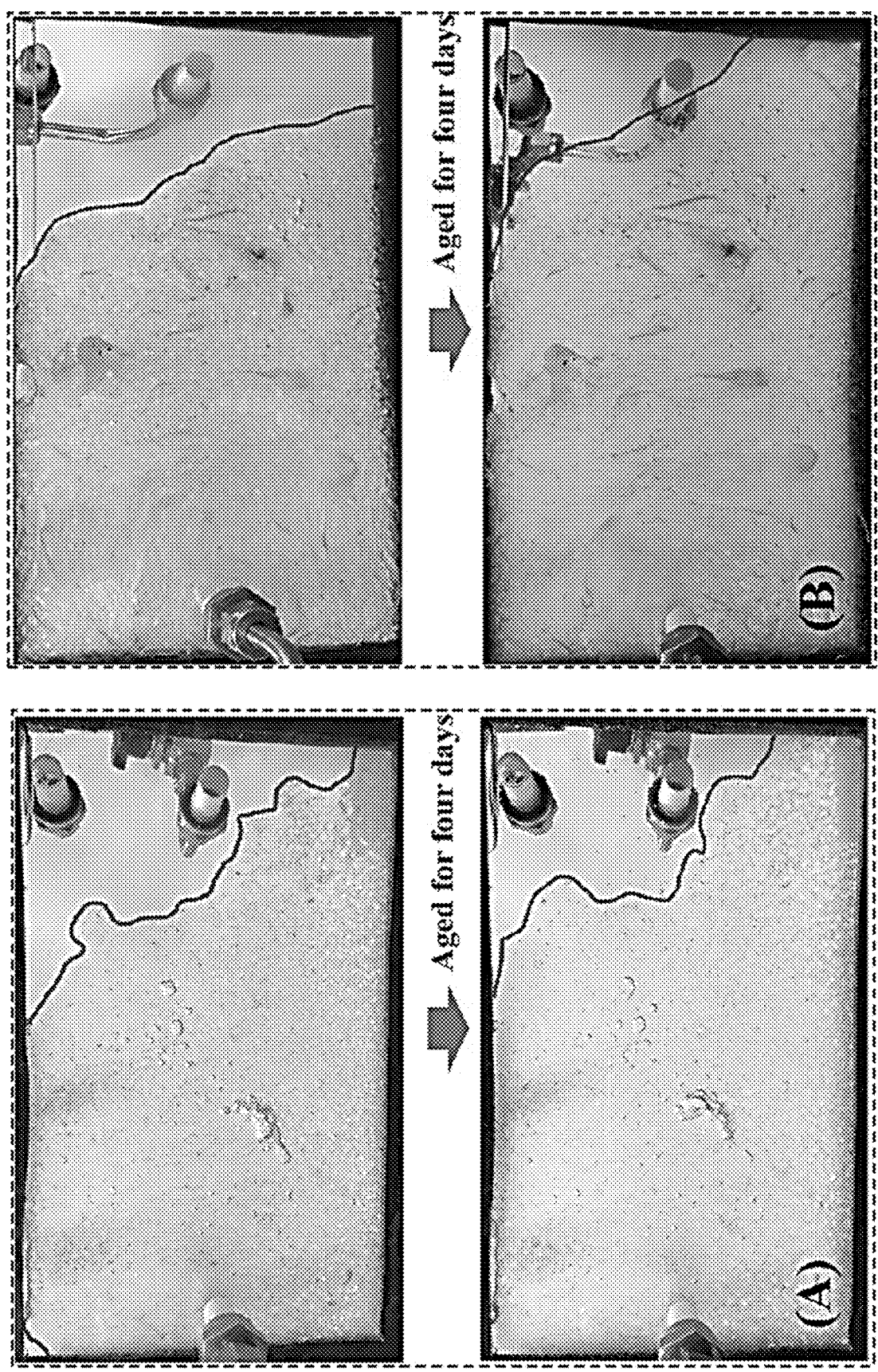
FIG. 3 is a set of photographs showing particle gel placement and movement over time in a fracture model.

As shown in the two upper images of FIG. 3, the RPPG front was considerably less impacted by the gravity after being placed, manifesting as a more vertical gel front. Additionally, the volume of fiber assisted RPPG increased more than 1/6 of its volume after placement, while the RPPG without fiber only had a slight volume increase.

Example 2

This example is a continuing of the experiments described in Example 1. After aging, colored brine was injected from the inlet to test the plugging performance of placed RPPG, which was represented by breakthrough pressure and water permeability after breakthrough. The brine injection pressure is shown in FIG. 4.

Figure 4:
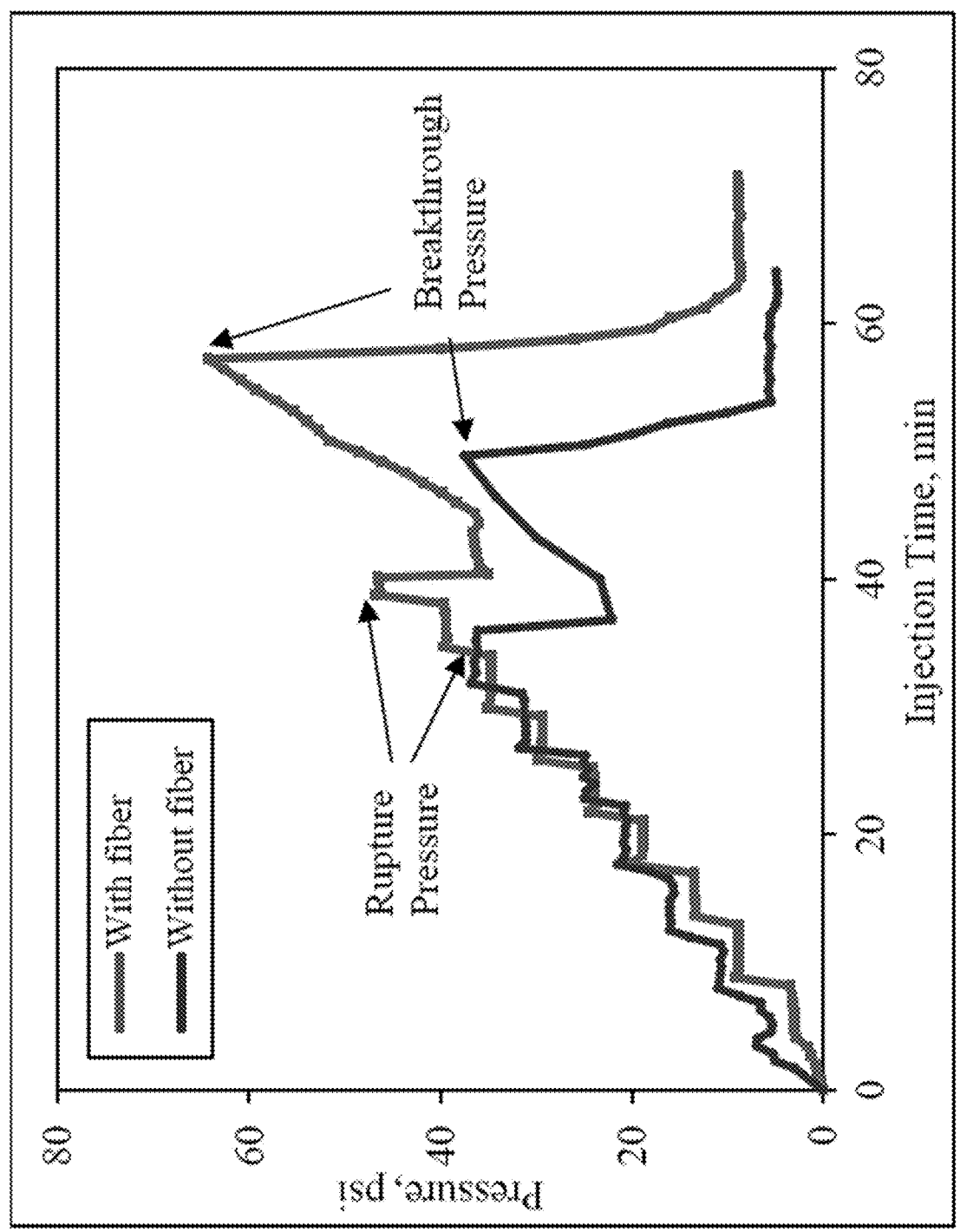
FIG. 4 is a graph showing rupture pressures and breakthrough pressures of gel compositions.

As shown in FIG. 4, a constant-pressure injection method was used before reaching the rupture pressure, at which pressure the water started to enter the RPPG-filled fracture. The brine was injected at constant pressure for a certain time and increased by a set value when the gel pack was not broken through. Then, the brine was injected at 2 mL/min until the end. As shown in FIG. 4, the fiber-assisted RPPG had a higher rupture pressure, breakthrough pressure, and constant-rate injection pressure, compared with the RPPG without fiber. The greater pressures indicated an improved performance of the fiber-assisted RPPG for resisting water flow both before and after breakthrough.

Figure 5:
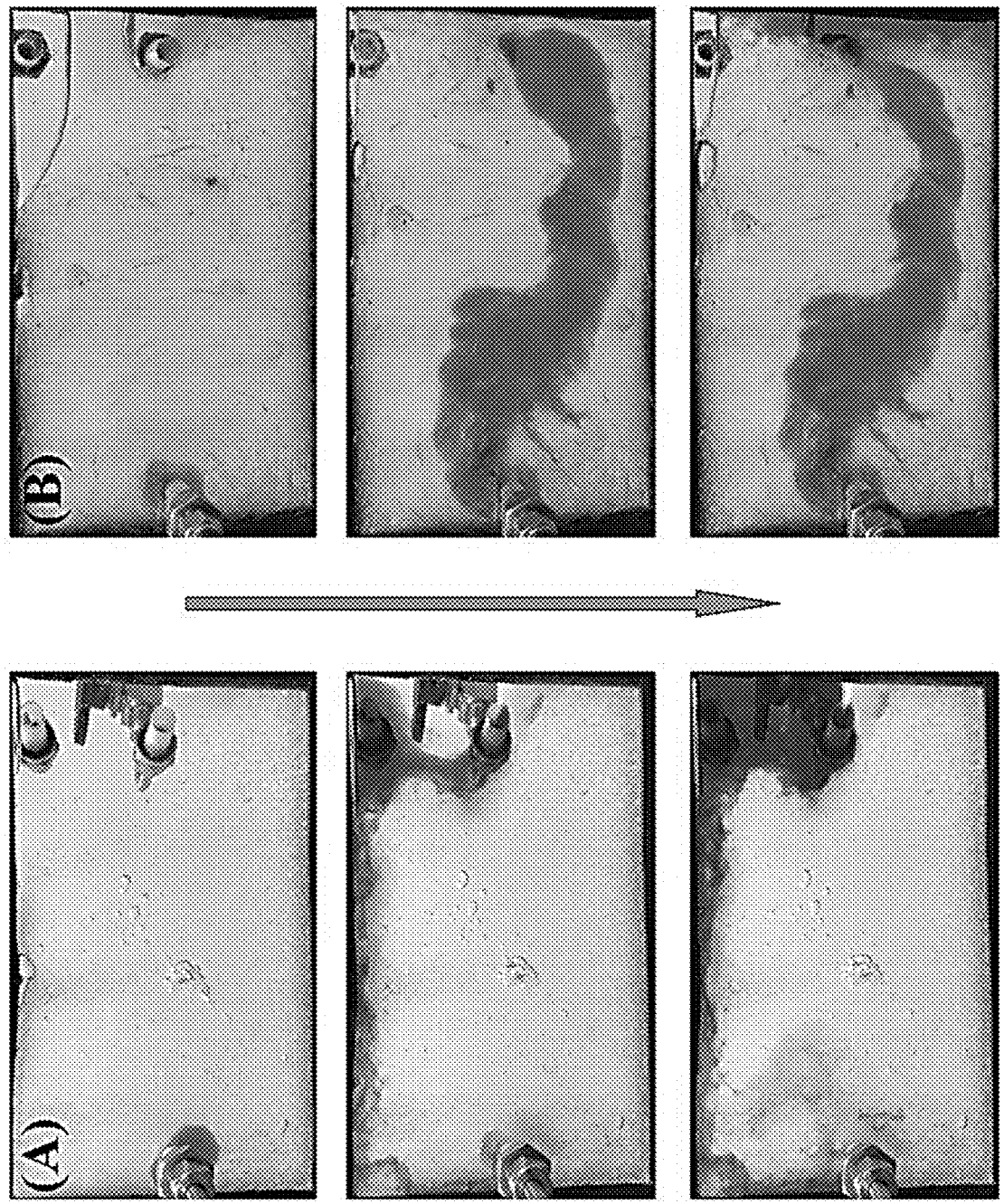
FIG. 5 is a set of photographs showing fluid movement through the particle gels in the fracture model.

To demonstrate the plugging performance of RPPG more intuitively, the flow of dyed brine inside the transparent model is shown in FIG. 5.

In FIG. 5 (image A), the water (dyed) broke through the upper part of gel and showed an overriding behavior when fiber was not added. Because in this model with a considerable vertical aperture, the RPPG was impacted by the gravity and tended to concentrate to the lower space, leaving the upper space less plugged. However, as shown in FIG. 5 (image B), when the RPPG was assisted with fiber, the gel pack was significantly more homogenous, and therefore, the water flowed following the shortest path between inlet and outlet. In addition, the color of flowing path was lighter, which suggested a narrower channel along the path. These results visually confirmed the plugging performance improvement of the fiber-assisted RPPG indicated by pressure measurement.

Example 3

Figure 6:
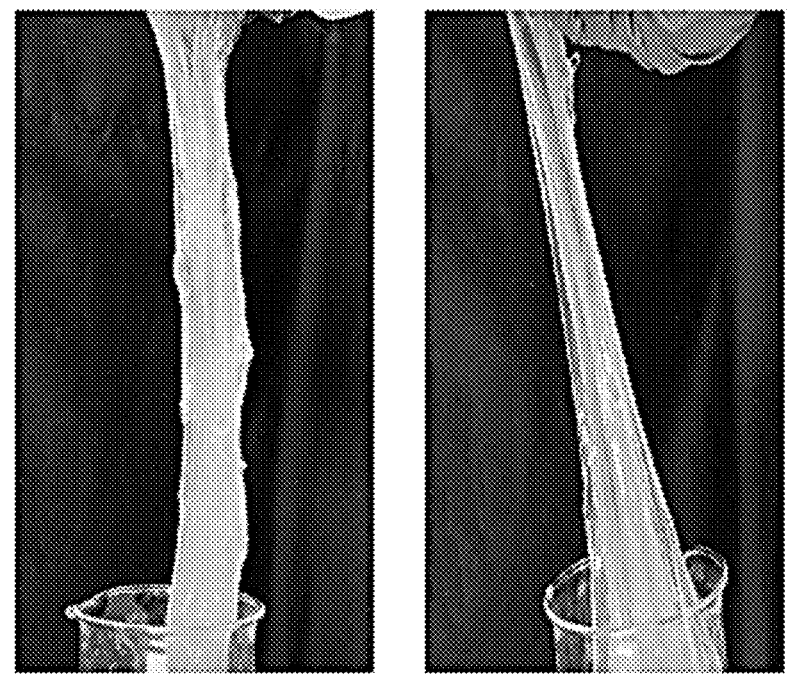
FIG. 6 is a set of photographs showing particle gel compositions with and without fiber.
Figure 6:
Figure 6:
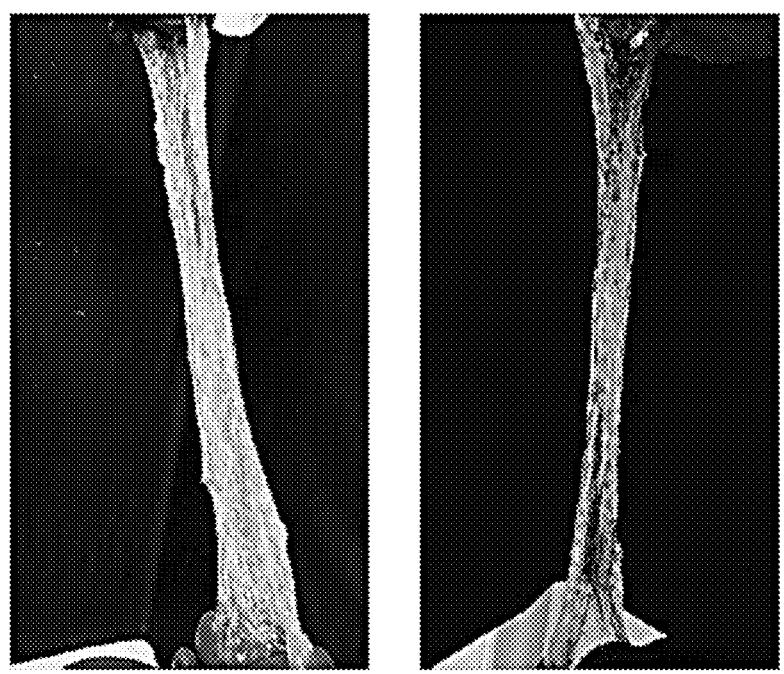

A series of tests were performed to analyze the swelling characteristics of RPPG compositions using different concentrations of fiber, particle sizes, and brine compositions. First, 90 g 1% NaCl was mixed with and without 0.4 wt % fiber to form homogenous mixtures. The fiber was a commercial SuperSweep® Fiber from FortaInc. The brine was mixed with 10 g dry RPPG (polyacrylamide/zirconium (IV)) particles 1-2 mm to form a homogenous mixture. The mixture was stirred for 5 minutes to simulate the blending and turbulent flow during injection in the real field application. As shown in FIG. 6, the gel composition comprising 0.4 wt % fiber had a hazier appearance compared to the composition without fiber.

Figure 7:
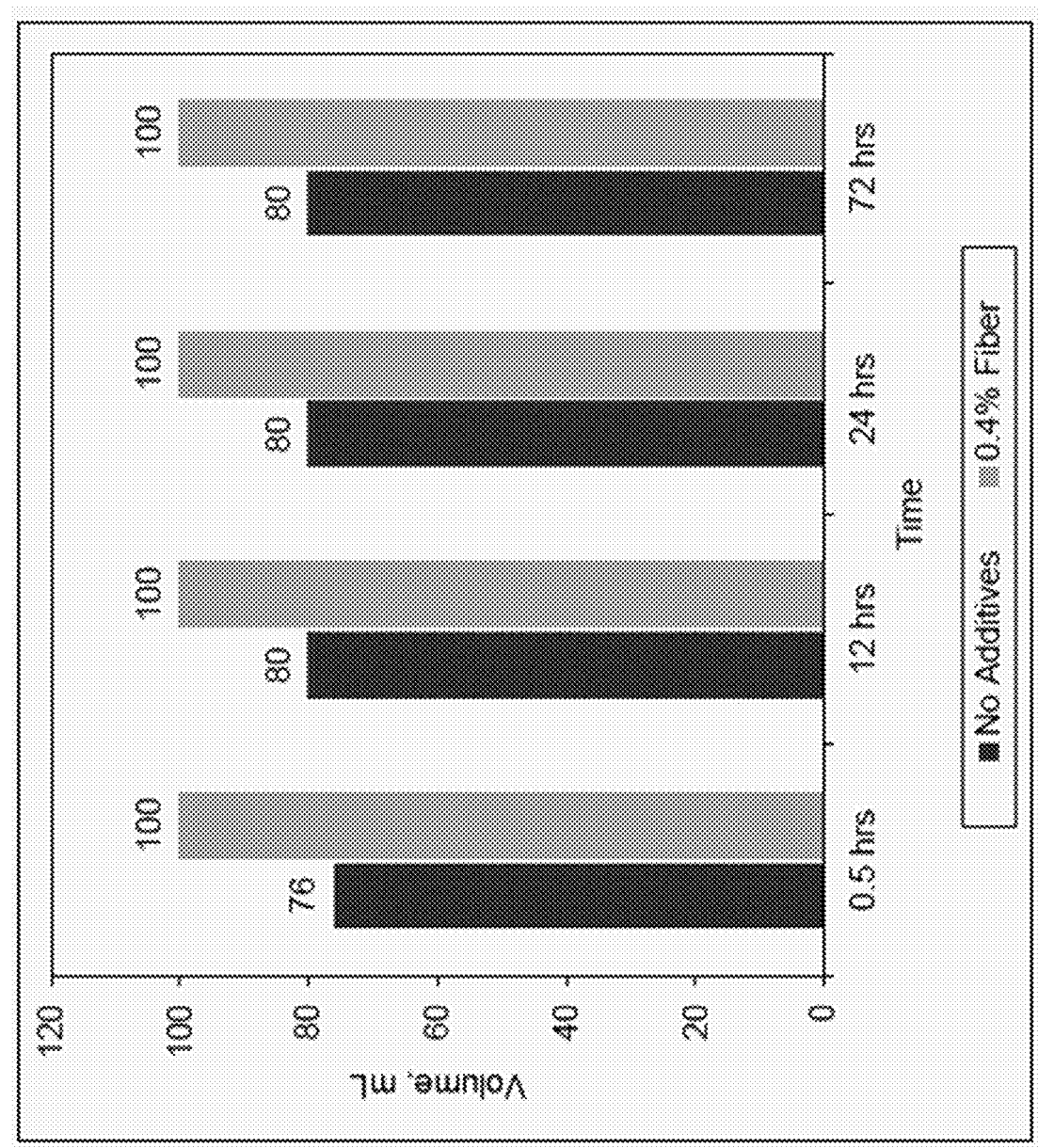
FIG. 7 is a graph showing particle gel volume change over time with and without fiber.

The mixture was poured into the graduated cylinders and the volume change was inspected visually for 72 hours. As shown in FIG. 7, the particles in the reassembled RPPG composition without fiber settled noticeably, which resulted in an effective volume of the particle gel (i.e., the portion of the brine comprising suspended particles) within the cylinder of 76-80 mL. In contrast, the particles in the reassembled RPPG composition with 0.4 wt % fiber remained suspended in the full composition, which resulted in an effective volume of about 100 mL.

Figure 8:
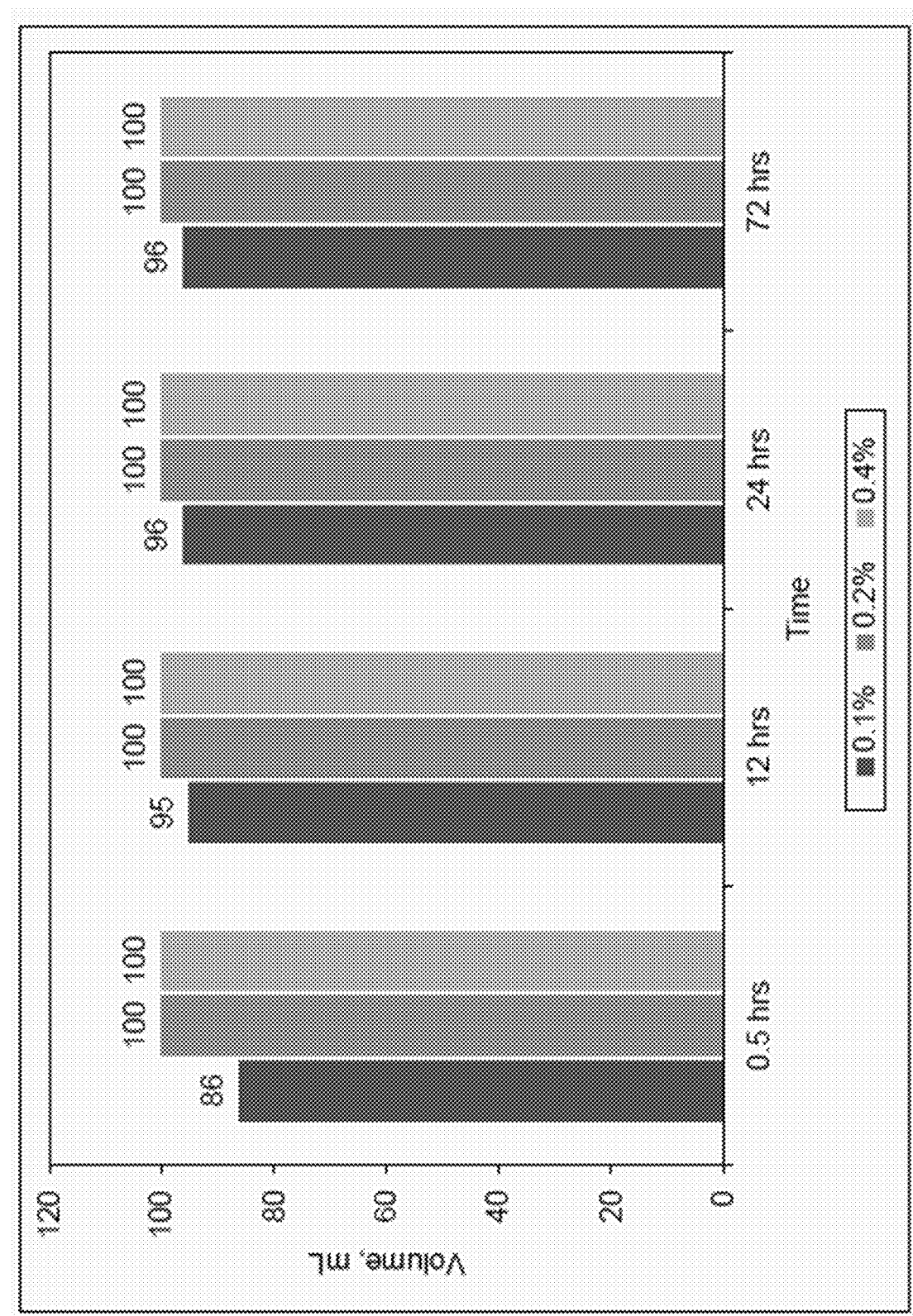
FIG. 8 is a graph showing particle gel volume change over time at different fiber concentrations.

The experiment was repeated using different concentrations of fiber in the RPPG composition. As shown in FIG. 8, all tested compositions (0.1 wt %, 0.2 wt %, and 0.4 wt %) showed improved volume retention compared to the composition tested above without fiber. However, 0.2 wt % and 0.4 wt % fiber showed superior results (100 mL volume) compared to 0.1 wt % fiber.

The experiment was repeated using 1-4 mm RPPG particles (50% 1-2 mm, 50% 2-4 mm), 2% KCl brine, and 0.5 wt % fiber concentration. Similar to the fiber-containing compositions above, the particles remained suspended in the full composition, which resulted in an effective volume of about 100 mL.

Figure 9:
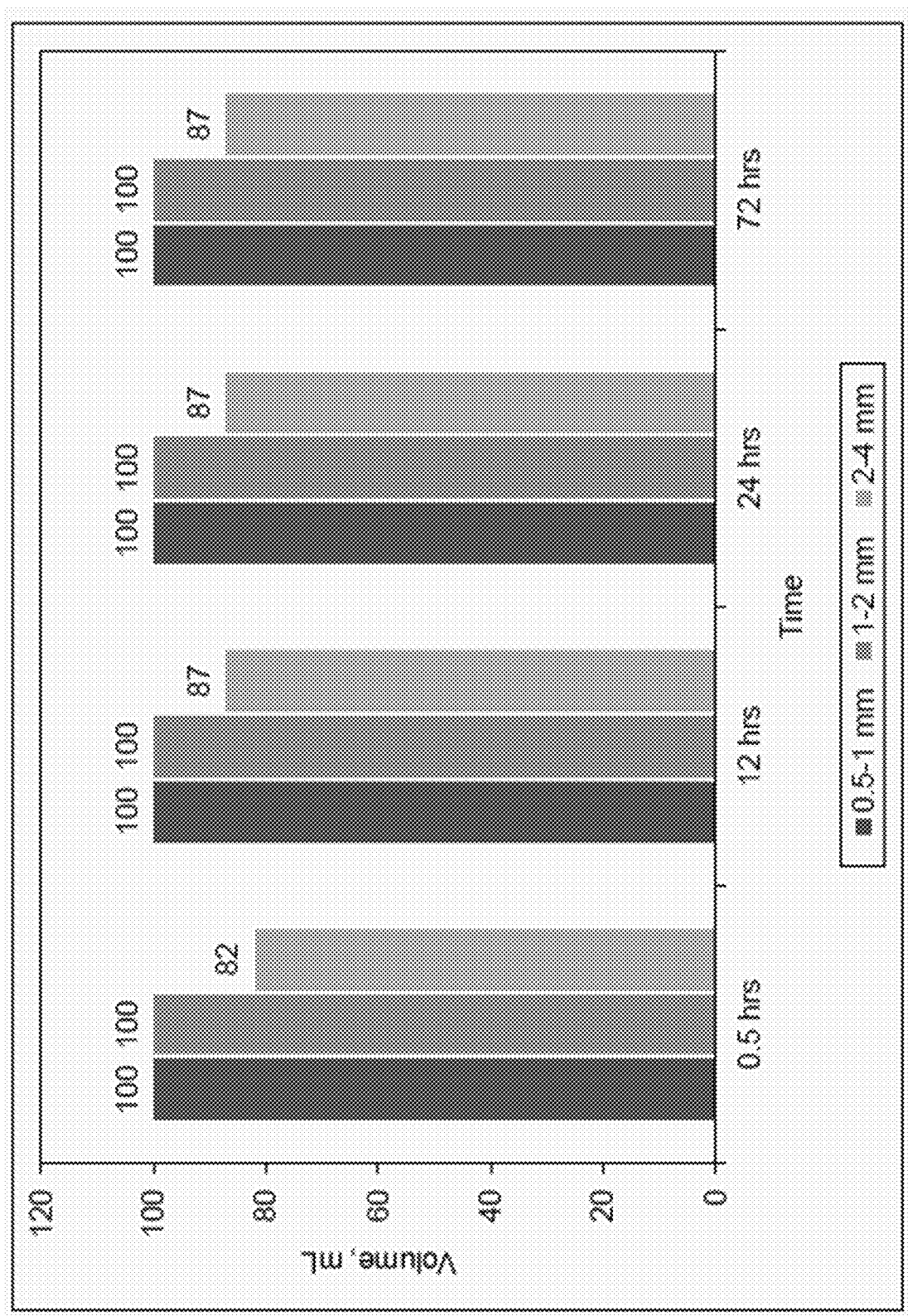
FIG. 9 is a graph showing particle gel volume change over time using different particles sizes.

The experiment was repeated using 1% NaCl brine, a fiber concentration of 0.2%, and different particle sizes. As shown in FIG. 9, all tested compositions (0.5-1 mm, 1-2 mm, and 2-4 mm) showed improved volume retention compared to the composition tested above without fiber. However, the smaller particles (0.5-1 mm and 1-2 mm) showed superior results (100 mL volume) compared to the larger particles (2-4 mm). A higher fiber concentration is likely needed for larger particles to remain suspended.

Figure 10:
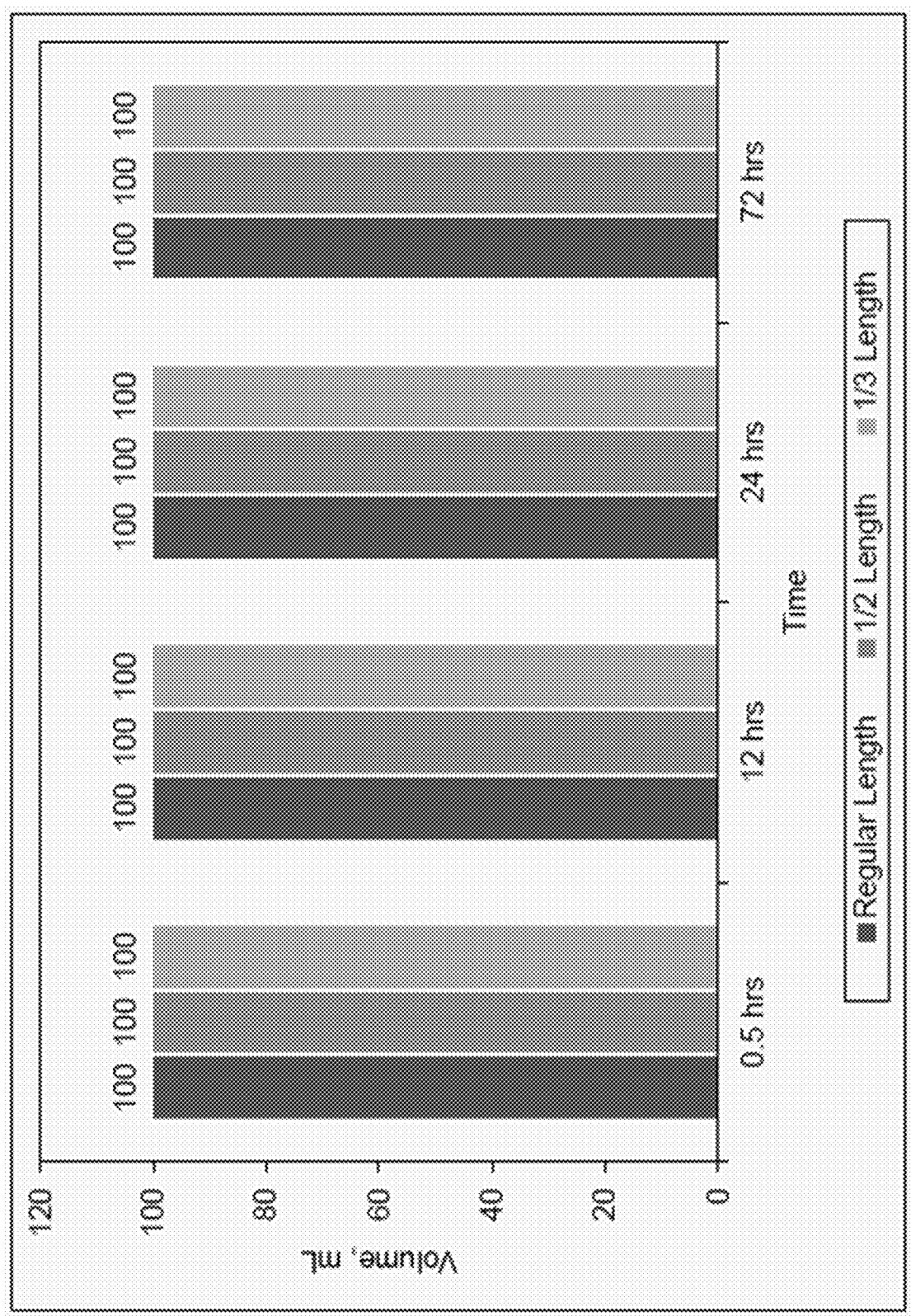
FIG. 10 is a graph showing particle gel volume change over time using different fiber lengths.

The experiment was repeated using 1-2 mm RPPG particles, 1% NaCl brine, a fiber concentration of 0.2 wt %, and nylon fibers of varying lengths (1.3 cm, 0.65 cm, 0.43 cm). As shown in FIG. 10, fiber length did not noticeably affect the RPPG swelling.

Example 4

Figure 11:
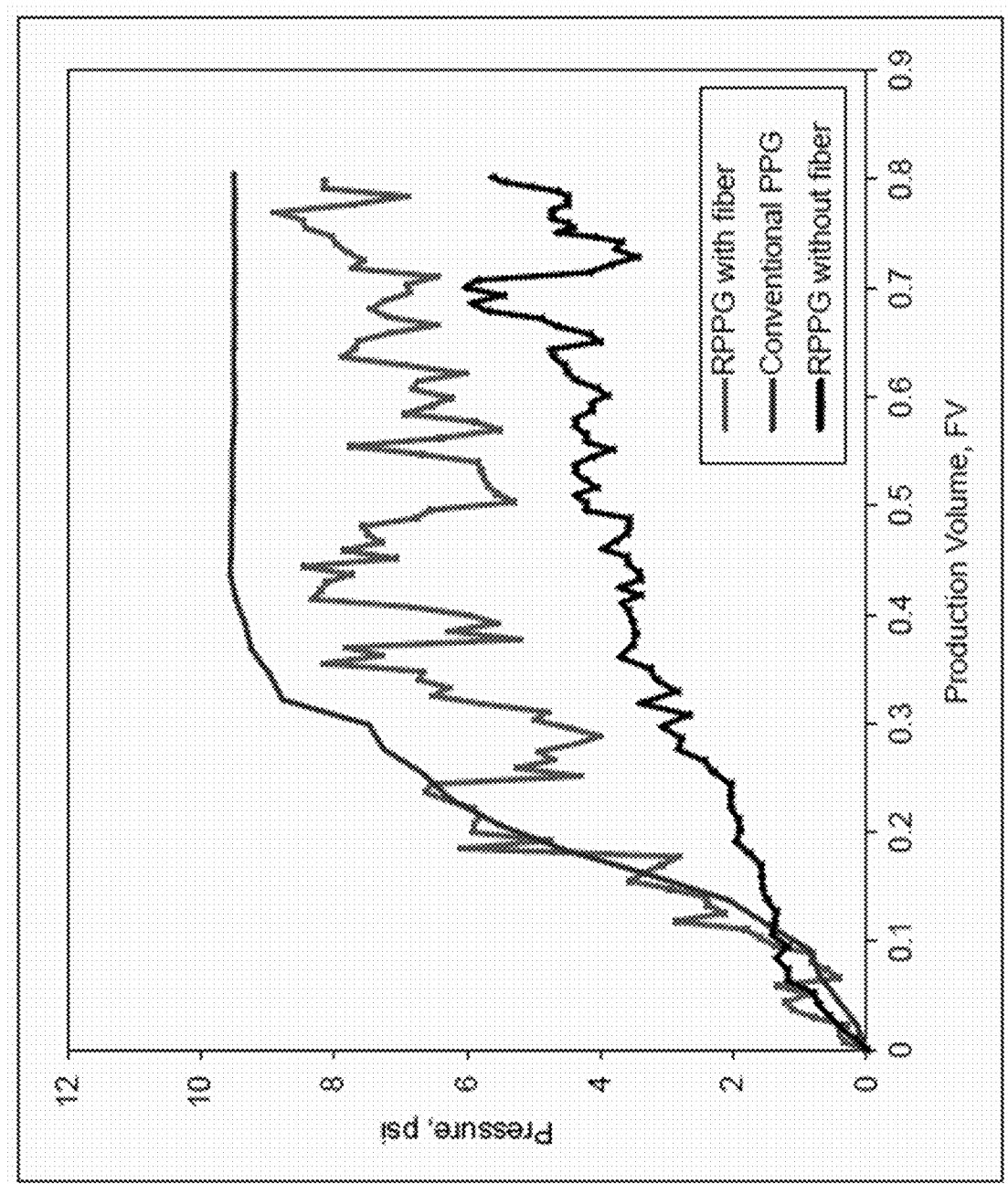
FIG. 11 is a graph showing injection pressures using different particle gel compositions.

Water plugging performance was tested and compared for conventional PPG, RPPG (without fiber), and fiber assisted RPPG (from Example 1). The testing apparatus was the fracture model used in Example 1 above. The injectivity (as evidenced by pressure) of each composition is shown in FIG. 11. As shown in Table 1 below, the permeability of the fiber assisted RPPG was superior to the RPPG, which was superior to the convention RPPG for all flow rates.

TABLE 1

| Flow rate | Conventional PPG | RPPG | Fiber Assisted RPPG |
| --- | --- | --- | --- |
| 2 mL/min | 2505.3 md | 120.0 md | 70.1 md |
| 3 mL/min | 2846.5 md | 149.1 md | 97.8 md |
| 5 mL/min | 3131.1 md | 214.5 md | 125.2 md |

The invention claimed is:

1. A composition useful for controlling fluid flow, said composition comprising a quantity of fibers and a quantity of swellable particles comprising a crosslinking agent and/or an assembling agent interspersed among polymer chains.

2. The composition of claim 1, wherein the quantity of fibers comprises a natural fiber material.

3. The composition of claim 2, wherein the quantity of fibers comprises vegetable fiber, wood fiber, animal fiber, mineral fiber, and/or biological fiber.

4. The composition of claim 1, wherein the quantity of fibers comprises a man-made fiber material.

5. The composition of claim 4, wherein the quantity of fibers comprises semi-synthetic and/or synthetic fiber.

6. The composition of claim 5, wherein the quantity of fibers comprises cellulose regenerated fibers, metallic fibers, carbon fibers, silicon carbide fibers, fiberglass, mineral fibers, and/or polymer fibers.

7. The composition of claim 6, wherein the quantity of fibers comprises a synthetic fiber material selected from the group consisting of polyethylene, polypropylene, nylons, and polyvinyl alcohol.

8. The composition of claim 1, wherein the fibers within the quantity of fibers have an average length of about 0.1 mm to about 100 mm.

9. The composition of claim 1, wherein the fibers within the quantity of fibers have an average diameter of about 0.1 µm to about 1,000 µm.

10. The composition of claim 1, wherein the fibers within the quantity of fibers have an aspect ratio of about 10 to about 1000.

11. The composition of claim 1, wherein the swellable particles comprise polymer chains formed from one or more monomers selected from the group consisting of acrylamides, sugars/saccharides, chloroprene, nitrile-containing compounds, sulfonates, acrylates, methacrylate, silicates, nano-clays and combinations of the foregoing.

12. The composition of claim 11, wherein the swellable particles comprise an assembling agent selected from the group consisting of polyacrylamide, one of the multivalent Group III-VII transition metal molecules, methylene bisacrylamide, polyethylene glycol, dimethacrylate, phenol-formaldehyde, diallylamine, triallylamine, divinyl sulfonate, diethylene glycol diallyl aldehydes, diethyeneglycol diallyl ether, polyethyleneimine, dichlorophenol, benzoyl peroxide, di-tert-butyl peroxide, dibutyl hydrogen phosphite (DBHP), and mixtures thereof.

13. The composition of claim 1, wherein the swellable particles comprise a polymer matrix comprised of a monomer having a re-cross-linking moiety, a monomer having an acid resistance moiety, a monomer having a $CO_2$-philic moiety, and/or a cross-linkable monomer.

14. The composition of claim 1, wherein the swellable particles comprise a cross-linking agent and/or a re-cross-linking agent.

15. The composition of claim 1, wherein the swellable particles further comprise tackifiers, plasticizers, polymers, aromatic compounds, polysaccharides, deoxidants, adjustors of gelant, clays, nanoclay, initiators, stabilizers, celluloses, epoxy resins, silica, silicon oxide, aluminum oxide, carbon nanotubes, graphene, ethylenediaminetetraacetic acid, nanoparticles, oxygen scavengers, chelating agents, thickening agents, fibers, and/or biocides.

16. The composition of claim 1, wherein the composition comprises the quantity of fibers and the quantity of swellable particles at a weight ratio of about 1:1000 to about 10:1.

17. The composition of claim 1, wherein the quantity of fibers and the quantity of swellable particles are dispersed in a carrier fluid.

18. The composition of claim 17, wherein the carrier fluid comprises an aqueous solvent system.

19. The composition of claim 17, wherein the composition comprises from about 0.01% by weight to about 20% by weight of the quantity of fibers.

20. The composition of claim 17, wherein the composition comprises from about 0.1% to about 40% by weight of the quantity of swellable particles.

21. A method of forming a gel formation in a target zone of a subterranean environment, said method comprising introducing the composition of any one of claims 1 through 20 into the subterranean environment.

22. The method of claim 21, further comprising performing one or more of the following:
(i) contacting the composition with a fluid, thereby causing the composition to swell;
(ii) exposing the composition to a temperature of at least 50° C. within the target zone, thereby causing at least a portion of the cross-linkable polymer chains to cross-link.

23. The method of claim 22, wherein the swelling (i) results in the association, cross-linking, and/or reassembly of the cross-linkable polymer chains.

24. The method of claim 22, wherein said swelling (i) causes the quantity of particles to associate, combine together, and form a bulk gel.

25. The method of claim 22, wherein the fluid is an aqueous solvent system.

26. The method of claim 21, wherein the environment is selected from the group consisting of wells, pipelines, and fractures.

27. The method of claim 21, wherein the quantity of particles have an initial average particle size prior to contact with the fluid and wherein upon contact with the fluid, the quantity of particles swell to a second average particle size that is about 5 times to about 200 times that of the initial average particle size.

28. A method of forming the composition of any one of claims 1-20, the method comprising:
(i) dispersing the quantity of fibers in a carrier fluid and forming a homogenous mixture; and
(ii) dispersing the quantity of swellable particles in the homogenous mixture, thereby causing at least a portion of the quantity of swellable particles to swell.

29. A method of forming the composition of any one of claims 1-20, the method comprising:
(i) mixing the quantity of fibers and the quantity of swellable particles to form a homogenous mixture; and
(ii) contacting the homogenous mixture with a carrier fluid, thereby causing at least a portion of the quantity of swellable particles to swell.

* * * * *